(12) United States Patent
Makhlouf

(10) Patent No.: US 9,743,155 B2
(45) Date of Patent: *Aug. 22, 2017

(54) SYSTEM AND METHOD FOR ENGAGEMENT AND DISTRIBUTION OF MEDIA CONTENT

(71) Applicant: Samir B. Makhlouf, Atlanta, GA (US)

(72) Inventor: Samir B. Makhlouf, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/081,353

(22) Filed: Mar. 25, 2016

(65) Prior Publication Data

US 2016/0212500 A1 Jul. 21, 2016

Related U.S. Application Data

(63) Continuation of application No. 14/925,409, filed on Oct. 28, 2015, now Pat. No. 9,392,342, which is a
(Continued)

(51) Int. Cl.
*H04N 5/445* (2011.01)
*G06F 13/00* (2006.01)
(Continued)

(52) U.S. Cl.
CPC ......... *H04N 21/812* (2013.01); *G06Q 30/02* (2013.01); *G06Q 30/0241* (2013.01); *H04N 21/222* (2013.01); *H04N 21/2542* (2013.01); *H04N 21/25891* (2013.01); *H04N 21/431* (2013.01); *H04N 21/4312* (2013.01); *H04N 21/4316* (2013.01); *H04N 21/44222* (2013.01); *H04N 21/4667* (2013.01); *H04N 21/4722* (2013.01); *H04N 21/4725* (2013.01); *H04N 21/4755* (2013.01); *H04N 21/47205* (2013.01); *H04N 21/47815* (2013.01); *H04N 21/482* (2013.01); *H04N 21/8173* (2013.01); *H04N 21/858* (2013.01); *H04N 21/8547* (2013.01)

(58) Field of Classification Search
CPC .......................... H04N 21/222; H04N 21/254
See application file for complete search history.

(56) References Cited

U.S. PATENT DOCUMENTS 6,008,803 A 12/1999 Rowe et al.
6,177,931 B1 1/2001 Alexander et al.
(Continued)

OTHER PUBLICATIONS

Makhlouf, Samir, B.; U.S. Patent Application entitled: System and Method for Engagement and Distribution of Media Content having U.S. Appl. No. 15/226,810, filed Aug. 2, 2016, 90 pgs.
(Continued)

*Primary Examiner* — Hunter B Lonsberry
(74) *Attorney, Agent, or Firm* — Taylor English Duma LLP

(57) ABSTRACT

Disclosed is a system and method for distributing media content including an engagement system including a stamp server, the stamp server including a memory and a processor, a content system including a content server, the content server including a memory and a processor, and a user system communicatively connected to the engagement system and the content system, the user system configured to receive a stamp from at least one of the engagement system and the content system, and present the stamp and a stamp indicator on a display of the user system.

19 Claims, 10 Drawing Sheets

Related U.S. Application Data continuation of application No. 14/310,018, filed on Jun. 20, 2014, now Pat. No. 9,326,043.

(51) Int. Cl.

| | |
|---|---|
| *G06F 3/00* | (2006.01) |
| *H04N 21/81* | (2011.01) |
| *G06Q 30/02* | (2012.01) |
| *H04N 21/222* | (2011.01) |
| *H04N 21/254* | (2011.01) |
| *H04N 21/258* | (2011.01) |
| *H04N 21/431* | (2011.01) |
| *H04N 21/442* | (2011.01) |
| *H04N 21/472* | (2011.01) |
| *H04N 21/4722* | (2011.01) |
| *H04N 21/475* | (2011.01) |
| *H04N 21/478* | (2011.01) |
| *H04N 21/8547* | (2011.01) |
| *H04N 21/858* | (2011.01) |
| *H04N 21/466* | (2011.01) |
| *H04N 21/4725* | (2011.01) |
| *H04N 21/482* | (2011.01) |

(56) References Cited

U.S. PATENT DOCUMENTS

| | | | |
|---|---|---|---|
| 6,230,324 B1 | 5/2001 | Tomita et al. | |
| 6,718,551 B1 | 4/2004 | Swix et al. | |
| 7,293,066 B1 | 11/2007 | Day | |
| 7,444,659 B2 * | 10/2008 | Lemmons | H04N 7/17318 375/E7.006 |
| 7,493,636 B2 | 2/2009 | Kitsukawa et al. | |
| 7,496,945 B2 | 2/2009 | Rodriguez | |
| 7,739,710 B2 | 6/2010 | Kwon et al. | |
| 7,839,385 B2 | 11/2010 | Hunleth et al. | |
| 7,900,228 B2 | 3/2011 | Stark et al. | |
| 7,992,179 B1 | 8/2011 | Kapner, III et al. | |
| 8,079,054 B1 | 12/2011 | Dhawan et al. | |
| 8,453,171 B2 | 5/2013 | Koplar | |
| 8,607,269 B2 | 12/2013 | Needham et al. | |
| 8,656,431 B2 | 2/2014 | Cavicchia | |
| 8,661,466 B2 | 2/2014 | Stephens | |
| 8,799,977 B1 | 8/2014 | Kapner, III et al. | |
| 9,049,471 B2 | 6/2015 | Krapf et al. | |
| 9,326,043 B2 | 4/2016 | Makhlouf | |
| 9,392,342 B2 | 7/2016 | Makhlouf | |
| 9,479,838 B2 | 10/2016 | Makhlouf | |
| 2001/0034883 A1 | 10/2001 | Zigmond | |
| 2003/0131357 A1 | 7/2003 | Kim | |
| 2004/0103439 A1 | 5/2004 | Macrae et al. | |
| 2004/0154040 A1 | 8/2004 | Ellis | |
| 2004/0221303 A1 | 11/2004 | Sie et al. | |
| 2005/0028206 A1 | 2/2005 | Cameron et al. | |
| 2005/0086692 A1 | 4/2005 | Dudkiewicz et al. | |
| 2005/0251820 A1 | 11/2005 | Stefanik et al. | |
| 2005/0278794 A1 | 12/2005 | Leinonen et al. | |
| 2006/0090131 A1 | 4/2006 | Kumagai | |
| 2007/0124777 A1 | 5/2007 | Bennett et al. | |
| 2008/0196075 A1 | 8/2008 | Candelore | |
| 2008/0244657 A1 | 10/2008 | Arsenault et al. | |
| 2008/0281699 A1 | 11/2008 | Whitehead | |
| 2008/0300985 A1 | 12/2008 | Shamp | |
| 2009/0007178 A1 | 1/2009 | Artom | |
| 2009/0138904 A1 | 5/2009 | Kitsukawa | |
| 2009/0141174 A1 | 6/2009 | Hardacker et al. | |
| 2009/0241145 A1 | 9/2009 | Sharma | |
| 2009/0254931 A1 | 10/2009 | Pizzurro | |
| 2009/0327346 A1 | 12/2009 | Teinila | |
| 2010/0175090 A1 | 7/2010 | Cordray | |
| 2010/0199312 A1 | 8/2010 | Chang et al. | |
| 2010/0269140 A1 | 10/2010 | Shin et al. | |
| 2011/0107372 A1 | 5/2011 | Walter | |
| 2011/0126226 A1 | 5/2011 | Makhlouf | |
| 2011/0126234 A1 | 5/2011 | Makhlouf | |
| 2011/0126249 A1 | 5/2011 | Makhlouf | |
| 2011/0292283 A1 | 12/2011 | Stephens | |
| 2012/0278727 A1 | 11/2012 | Ananthakrishnan | |
| 2012/0291104 A1 | 11/2012 | Hasek | |
| 2013/0046641 A1 | 2/2013 | Devree | |
| 2013/0276008 A1 | 10/2013 | Wu | |
| 2014/0259045 A1 | 9/2014 | Sangal | |
| 2016/0345076 A1 | 11/2016 | Makhlouf | |

OTHER PUBLICATIONS

Makhlouf, Samir; Supplemental Notice of Allowance for U.S. Appl. No. 12/592,369, filed Nov. 24, 2009, mailed Jun. 22, 2016, 6 pgs.

Makhlouf, Samir; U.S. Patent Application entitled: System and Method for Distributing Media Content From Multiple Sources having U.S. Appl. No. 15/226,085, filed Aug. 2, 2016, 79 pgs.

Makhlouf, Samir B.; Final Office Action for U.S. Appl. No. 14/207,091, filed Mar. 12, 2014, mailed Oct. 27, 2015, 12 pgs.

Makhlouf, Samir B.; Non-Final Office Action for U.S. Appl. No. 14/207,091, filed Mar. 12, 2014, mailed May 6, 2015, 19 pgs.

Makhlouf, Samir B.; U.S. Patent Application entitled: System and Method for Reinforcing Brand Awareness With Minimal Intrusion on the View Experience, U.S. Appl. No. 14/207,091, filed Mar. 12, 2014; 19 pgs.

Makhlouf, Samir B.; Non-Final Office Action for U.S. Appl. No. 14/310,018, filed Jun. 20, 2014, mailed Sep. 21, 2015, 22 pgs.

Makhlouf, Samir B.; Notice of Allowance for U.S. Appl. No. 14/310,018, filed Jun. 20, 2014, mailed Nov. 2, 2015, 5 pgs.

Makhlouf, Samir B.; Notice of Allowance for U.S. Appl. No. 14/310,018, filed Jun. 20, 2014, mailed Mar. 10, 2016, 17 pgs.

Makhlouf, Samir B.; U.S. Patent Application entitled: System and Method for Engagement and Distribution of Media Content, U.S. Appl. No. 14/310,018, filed Jun. 20, 2014; 46 pgs.

Makhlouf, Samir B.; Non-Final Office Action for U.S. Appl. No. 14/925,409, filed Oct. 28, 2015, mailed Dec. 10, 2015, 19 pgs.

Makhlouf, Samir B.; Notice of Allowance for U.S. Appl. No. 14/925,409, filed Oct. 28, 2015, mailed Feb. 1, 2016, 9 pgs.

Makhlouf, Samir B.; Notice of Allowance for U.S. Appl. No. 14/925,409, filed Oct. 28, 2015, mailed Mar. 16, 2016, 17 pgs.

Makhlouf, Samir B.; U.S. Continuation Application entitled: System and Method for Engagement and Distribution of Media Content having U.S. Appl. No. 14/925,409, filed Oct. 28, 2015, 45 pgs.

Makhlouf, Samir; Final Office action for U.S. Appl. No. 12/592,369, filed Nov. 24, 2009, mailed Nov. 27, 2013, 14 pgs.

Makhlouf, Samir; Non-Final Office action for U.S. Appl. No. 12/592,369, filed Nov. 24, 2009, mailed Nov. 26, 2012, 10 pgs.

Makhlouf, Samir; Non-Final Office action for U.S. Appl. No. 12/592,369, filed Nov. 24, 2009, mailed May 20, 2013, 11 pgs.

Makhlouf, Samir; Non-Final Office action for U.S. Appl. No. 12/592,369, filed Nov. 24, 2009, mailed May 5, 2015, 12 pgs.

Makhlouf, Samir; U.S. Patent Application entitled: System and Method for Distributing Media Content From Multiple Sources having U.S. Appl. No. 12/592,369, filed Nov. 24, 2009, 99 pgs.

Makhlouf, Samir B.; Extended European Search Report for serial No. 14183901.9, filed Sep. 8, 2014, mailed Nov. 12, 2015, 9 pgs.

Makhlouf, Sam; U.S. Provisional Patent Application entitled: System and Method for Reinforcing Brand Awareness with Minimal Intrusion of the Viewer Experience under U.S. Appl. No. 61/852,114, filed Mar. 15, 2013; 37 pgs.

Makhlouf, Sam; Applicant Initiated Interview Summary for U.S. Appl. No. 12/592,403, filed Nov. 24, 2009, mailed Dec. 23, 2014, 3 pgs.

Makhlouf, Sam; Applicant Initiated Interview Summary for U.S. Appl. No. 12/592,403, filed Nov. 24, 2009, mailed Mar. 28, 2014, 3 pgs.

Makhlouf, Sam; Final Office Action for U.S. Appl. No. 12/592,401, filed Nov. 24, 2009, mailed Oct. 15, 2012, 21 pgs.

Makhlouf, Sam; Final Office Action for U.S. Appl. No. 12/592,403, filed Nov. 24, 2009, mailed Oct. 15, 2012, 12 pgs.

Makhlouf, Sam; Final Office Action for U.S. Appl. No. 12/592,403, filed Nov. 24, 2009, mailed Nov. 17, 2014, 10 pgs.

(56) References Cited

OTHER PUBLICATIONS

Makhlouf, Sam; Final Office Action for U.S. Appl. No. 12/592,403, filed Nov. 24, 2009, mailed Nov. 7, 2013, 12 pgs.
Makhlouf, Sam; Non-Final Office Action for U.S. Appl. No. 12/592,401, filed Nov. 24, 2009, mailed Jan. 30, 2012, 25 pgs.
Makhlouf, Sam; Non-Final Office Action for U.S. Appl. No. 12/592,401, filed Nov. 24, 2009, mailed May 1, 2013, 25 pgs.
Makhlouf, Sam; Non-Final Office Action for U.S. Appl. No. 12/592,403, filed Nov. 24, 2009, filed Jul. 12, 2013, 16 pgs.
Makhlouf, Sam; Non-Final Office Action for U.S. Appl. No. 12/592,403, filed Nov. 24, 2009, mailed Feb. 1, 2012, 16 pgs.
Makhlouf, Sam; Non-Final Office Action for U.S. Appl. No. 12/592,403, filed Nov. 24, 2009, mailed May 26, 2015, 12 pgs.
Makhlouf, Sam; Non-Final Office Action for U.S. Appl. No. 12/592,403, filed Nov. 24, 2009, mailed Apr. 24, 2014, 11 pgs.
Makhlouf, Sam; U.S. Patent Application entitled: Media Content Distribution System and Method, having U.S. Appl. No. 12/592,401, filed Nov. 24, 2009, 98 pgs.
Makhlouf, Sam; U.S. Patent Application entitled: System and Method for Time Shifting Delivery of Media Content, having U.S. Appl. No. 12/592,403, filed Nov. 24, 2009, 99 pgs.
Makhlouf, Samir B.; Non-Final Office Action for U.S. Appl. No. 14/207,091, filed Mar. 12, 2014, mailed Jan. 15, 2016, 32 pgs.
Makhlouf, Samir B.; Issue Notification for U.S. Appl. No. 14/310,018, filed Jun. 20, 2014, mailed Apr. 6, 2016, 1 pg.
Makhlouf, Samir B.; Issue Notification for U.S. Appl. No. 14/925,409, filed Oct. 28, 2015, mailed Jun. 22, 2016, 1 pg.
Makhlouf, Samir; Notice of Allowance for U.S. Appl. No. 12/592,369, filed Nov. 24, 2009, mailed Jun. 3, 2016, 14 pgs.
Makhlouf, Samir B.; Final Office Action for U.S. Appl. No. 14/207,091, filed Mar. 12, 2014, mailed Oct. 18, 2016; 22 pgs.
Makhlouf, Samir; Issue Notification for U.S. Appl. No. 12/592,369, filed Nov. 24, 2009, mailed Oct. 5, 2016, 1 pg.
Makhlouf, Samir; Response to Amendment under Rule 312 for U.S. Appl. No. 12/592,369, filed Nov. 24, 2009, mailed Sep. 16, 2016, 8 pgs.
Makhlouf, Samir, B.; Non-final Office Action for U.S. Appl. No. 15/226,810, filed Aug. 2, 2016, mailed Mar. 3, 2017, 28 pgs.
Makhlouf, Samir B.; Non-final Office Action for U.S. Appl. No. 14/207,091, filed Mar. 12, 2014, dated May 15, 2017; 16 pgs.
Makhlouf, Samir B.; Applicant Initiated Interview Summary for U.S. Appl. No. 15/226,810, filed Aug. 2, 2016, dated Apr. 27, 2017, 3 pgs.
Makhlouf, Samir, B.; Notice of Allowance for U.S. Appl. No. 15/226,810, filed Aug. 2, 2016, dated May 30, 2017, 9 pgs.

* cited by examiner

SYSTEM AND METHOD FOR ENGAGEMENT AND DISTRIBUTION OF MEDIA CONTENT

CROSS-REFERENCE TO RELATED APPLICATIONS

This application is a continuation of U.S. application Ser. No. 14/925,409, filed Oct. 28, 2015, which is a continuation of U.S. application Ser. No. 14/310,018, filed Jun. 20, 2014, which are incorporated herein by reference. This application incorporates by reference U.S. patent application Ser. No. 14/207,091, filed Mar. 12, 2014, which claimed the benefit of U.S. Provisional Application No. 61/852,114, filed Mar. 15, 2013, the entire disclosures of which are hereby incorporated herein by reference.

FIELD OF THE INVENTION

The proposed system and method is generally directed to building brand or product awareness with minimal disruption of the audience/viewer experience when viewing visually perceivable media content, such as, movies, TV, streaming video, still imagery and other motion pictures/video content.

SUMMARY

Disclosed is a system for distributing media content including an engagement system, the engagement system including at least one advertisement server, the at least one advertisement server including at least one memory and at least one processor, a content system, the content system including at least one memory and at least one processor, and a user system, the user system being communicatively connected to the engagement system and content system, and the user system configured to receive at least one stamp from at least one of the engagement system and the content system.

Also disclosed is computer-readable medium encoded with non-transitory computer-executable instructions, the computer-executable instructions including logic configured to display content on a display; logic configured to present a first stamp on the display, the first stamp associated with a first ad placement; logic configured to present a second stamp on the display concurrent with the first stamp, the second stamp associated with a second ad placement; and logic configured for the user system to cause the stamps to be displayed on the display concurrent with content transmitted to the user system from a content system.

Further, a computer-implemented method is disclosed, including displaying content on a display; presenting a first stamp, the first stamp associated with a first ad placement, whereby the stamp remains displayed to at least one user; and presenting a second stamp concurrent with the first stamp, the second stamp associated with a second ad placement.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

The present disclosure describes systems and methods for an advertisement system. Although various implementations of the present disclosure are described with respect to advertisement systems related to lead ads, card ads, engagement ads, ad placement, and ad stamps, it should be understood that the present disclosure also may include other types of content, other than advertisement, without departing from the principles described herein. Other features and advantages will be apparent to one of ordinary skill in the art upon consideration of the general principles described herein, and all such features and advantages are intended to be included in the present disclosure.

Figure 1:
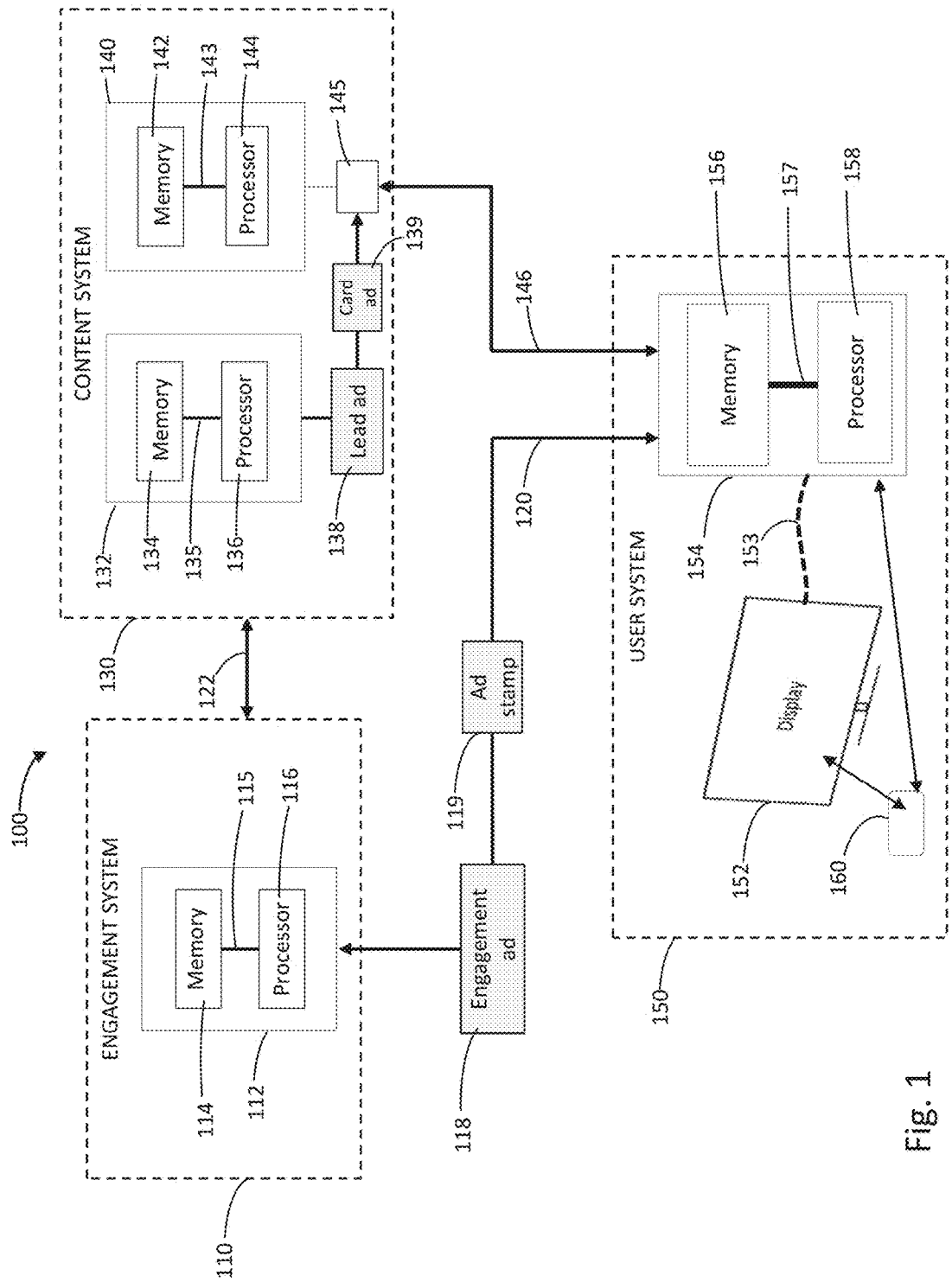
FIG. 1 is a block diagram illustrating an advertisement system, in accord with one embodiment of the current disclosure.

FIG. 1 depicts a block diagram illustrating an advertisement system 100 according to various implementations of the present disclosure. Advertisement system 100 may include an engagement system 110, content system 130, and a user system 150. Engagement system 110 may include an advertisement server 112 that includes one or more memory 114 operatively connected by connection 115 to one or more processor 116. The at least one memory 114 and at least one processor 116 are not required to be at the same location as one another or at the same locations as other portions of the memory 114 and processor 116. Advertisement server 112 may be a web server or any other type of server that enables communication of commands and data content. Also, connection 115 may include a wired connection, wireless connection, or a combination of a wired and wireless connection. The connection 115 may use communication channels for exchanging data and information, such as a computer bus channel, a local area network (LAN), wide area network (WAN), or the Internet, among others. Engagement advertisements ("engagement ads") 118 and advertisement stamps ("ad stamps") 119 (as described in further detail below) may be stored on the engagement system 110. Additionally, engagement system 110 may communicate with the user system 150 by the use of connection 120, which may be a wired communication, wireless communication, or a combination of wired and wireless communication. Connection 120 may use communication channels for exchanging data and information, such as a local area network (LAN), wide area network (WAN), the Internet, cables, fiber optic cables, satellite, Ethernet cable, a satellite dish, a coaxial cable, a telephone line (including DSL connections), broadband over power lines (BPL), ordinary VHF or UHF antennas, among others. Further, in some embodiments, connection 120 may transmit errors, problems, issues, complaints, or comments, among others between the engagement system 110 and user system 150.

Content system 130 may also be included in the advertisement system 100. In the current embodiment, an advertisement server 132 and a content server 140 are included. However, in other embodiments, the advertisement server 132 and content server 140 may be combined and operate on the same one or more servers. Content system 130 includes information and other content that is provided by a distributor, broadcaster, and/or multi-system operator (MSO) of content. In some embodiments, an advertisement agency may provide the content and information to the advertisement server 132 and/or other parts of the content system 130.

Advertisement server 132 may include one or more memory 134 operatively connected by connection 135 to one or more processor 136. The at least one memory 134 and at least one processor 136 are not required to be at the same location as one another or at the same locations as other portions of the memory 134 and processor 136. Advertisement server 132 may be a web server or any other type of server that enables communication of commands and data content. Also, connection 135 may include a wired connection, wireless connection, or a combination of a wired and wireless connection. The connection 135 may use communication channels for exchanging data and information, such as a computer bus channel, a local area network (LAN), wide area network (WAN), the Internet, among others. Lead advertisements ("lead ads") 138 and card advertisements ("card ads") 139 (as described in further detail below) may be stored on the advertisement server 132 or elsewhere in the content system 130.

Also, content server 140 may include one or more memory 142 operatively connected by connection 143 to one or more processor 144. The at least one memory 142 and at least one processor 144 are not required to be at the same location as one another or at the same locations as other portions of the memory 142 and processor 144. Content server 140 may be a web server or any other type of server that enables communication of commands and data content. Also, connection 143 may include a wired connection, wireless connection, or a combination of a wired and wireless connection. The connection 143 may use communication channels for exchanging data and information, such as a computer bus channel, a local area network (LAN), wide area network (WAN), the Internet, among others. Additionally, content system 130 may communicate with the user system 150 by the use of connection 146, which may be a wired communication, wireless communication, or a combination of wired and wireless communication. Connection 146 may use communication channels for exchanging data and information, such as a local area network (LAN), wide area network (WAN), the Internet, cables, fiber optic cables, satellite, Ethernet cable, a satellite dish, a coaxial cable, a telephone line (including DSL connections), broadband over power lines (BPL), ordinary VHF or UHF antennas, among others. Further, in some embodiments, connection 146 may transmit errors, problems, issues, complaints, or comments, among others between the content system 130 and user system 150.

In some embodiments, connection 120 and 146 may be combined to be one connection; however, in other embodiments there may be multiple connections. The lead ads 138 and card ads 139 hosted within the advertisement server 132 of the content system 130 are inserted into entertainment content (output by connection 146) within specified time slots by ad inserter 145. Such practices are done today and are understood by one of skill in the art. The operator of the ad inserter 145 may be the broadcaster, distributor, or MSO providing the content and/or advertisements, another broadcaster, distributor, or MSO, or a third party located in the same location as the content provider or remotely. Further, in some embodiments, connection 120 and/or 146 may transmit information associated with user device 150 to the engagement system 110 and/or content system 130. Information related to the user device 150 may be transmitted to the engagement system 110 and/or content system 130, such as, for example, what channel the user device 150 is tuned to, times of day the user device 150 is on, recorded content the user device 150 has recorded and/or is scheduled to record, genres or categories of programs and shows the user device 150 is tuned to, among others.

Also, in some embodiments, the engagement system 110 and content system 130 may be combined and operate on the same one or more servers. Additionally, in some embodiments, the engagement system 110 may be able to exchange information and communicate with the content system 130, as shown by connection 122. Such communication may include wired communication, wireless communication, or a combination of a wired and wireless communication. The communication may include communication channels for exchanging data and information, such as a local area network (LAN), wide area network (WAN), the Internet, among others. However, connection 122 is not required and some embodiments may not include such a connection. In some embodiments, the advertisement system 100 may include more than one engagement system 110, more than one content system 130, and more than one user system 150.

User system 150 communicates with and receives information, advertisements, and content (including but not limited to engagement ads 118, ad stamps 119, lead ads 138, card ads 139, storefront 519, pop-up interface 620, entertainment content, and/or ad placement 438) from the engagement system 110 and the content system 130, and in the current embodiment, a user system 150 may be included for each user. In some embodiments, a portion of or all of the engagement system 110 may be combined with the user system 150 and operate from the same location as the user system 150 and/or in a remote location. The user system 150 may include a display 152, which may be a television, computer, mobile device, tablet, smart device, or other electronic device, and there may be one or more displays 152. The display 152 may communicate with and receive information from a client server 154 by the use of connection 153. Connection 153 may be a wired connection, a wireless connection, or a combination of a wired and wireless connection. The connection may include communication channels for exchanging data and information, such as a computer bus, a local area network (LAN), wide area network (WAN), the Internet, among others.

Client server 154 may include one or more memory 156 operatively connected by connection 157 to one or more processors 158. The at least one memory 156 and at least one processor 158 are not required to be at the same location or at the same locations as other portions of the memory 156 and processor 158. Client server 154 may be a set-top box, other type of cable box, a web server, over-the-top content device, or any other type of device that enables communication of commands and data content. Also, connection 157 may include a wired connection, wireless connection, or a combination of a wired and wireless connection. The connection 157 may use communication channels for exchanging data and information, such as a computer bus channel, a local area network (LAN), wide area network (WAN), the Internet, among others. In some embodiments, client server 154 may be an over-the-top content device, digital media player (e.g., Apple TV), dongle (e.g., Chromecast), mobile device that connects with the display 152, among others. Moreover, if a user does not have a set-top box or any type of client server 154 connected to their display 152, the user may download a software application on their computer, tablet, smart phone, or other device that may be configured to work and function as a client server 154. In such embodiments, the memory and/or components of the processor may be located on the device the software application is running on or remotely on the engagement system 110. Also, other devices and systems may be used. In some embodiments, ad stamps 119 and content advertisements (as described later, content advertisements may include one or more lead ad 138, card ad 139, or advertisement placements ("ad placement") 438) may be initially viewed or recorded on one display 152, and then may be accessed by another display 152 (e.g., via the user profile 510). For example, a user may view or recorded a program on the set-top box with a television connected as the display 152, and the user may access the user profile 510, and ad stamps 119 and content advertisements associated with that viewed or recorded program on their mobile device. Voice control associated with the user system 150 may also be used because, in some embodiments, the components of the user system 150 are compatible with voice control.

A control device 160 may also be included to control the display 152 and client server 154. The control device 160 may be a market provided remote control, a control application on a smart device (e.g., smart phone or tablet), or other type of control that enables a user to manage and control the display 152 and client server 154. The control device 160 may include one or more buttons (raised buttons or touch screen) to make selections in the advertisement system 100.

Figure 2:
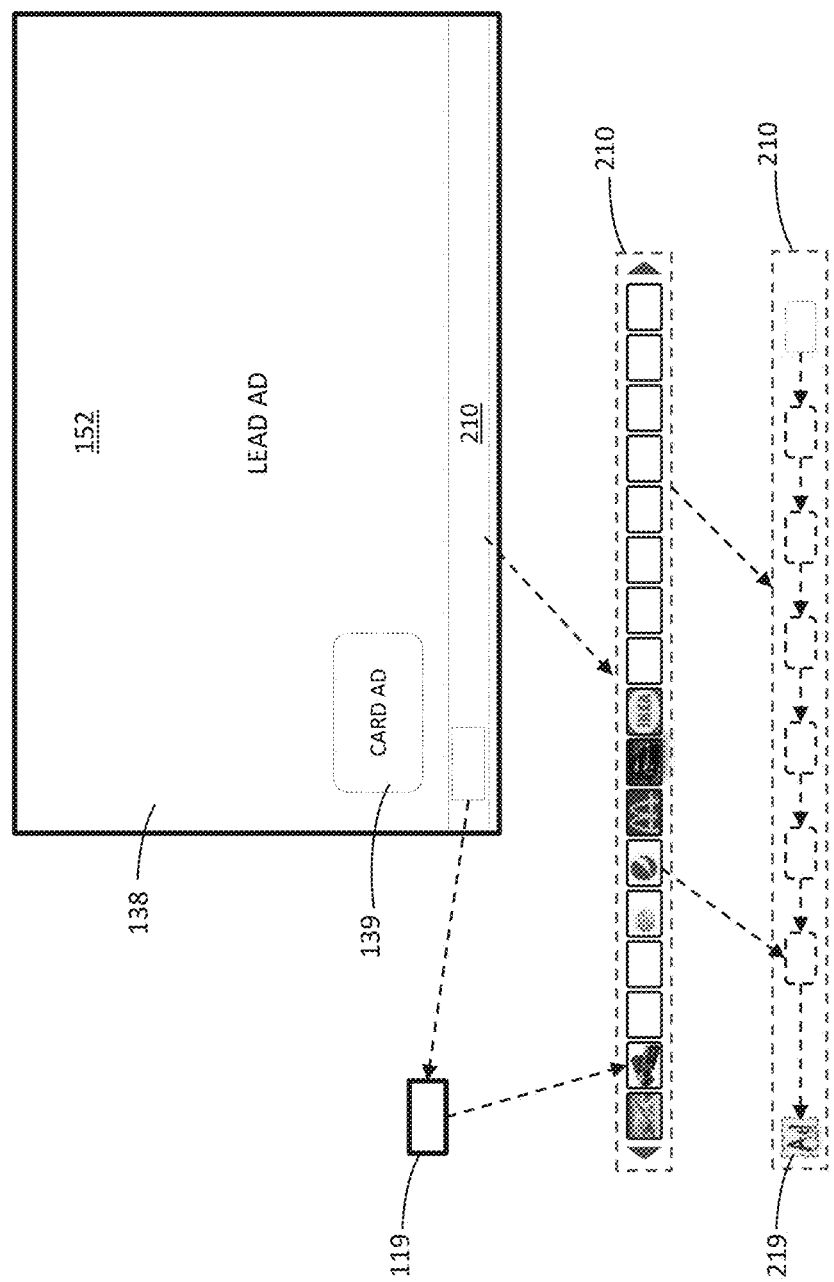
FIG. 2 is an exemplary diagram of a lead ad, card ad, ad stamps, and strip on the display of the advertisement system of FIG. 1.

FIG. 2 shows a lead ad 138 and card ad 139 on the display 152. Additionally, the display 152 may include one or more ad stamps 119 that are included in a strip 210. Each of the lead ad 138, card ad 139, and ad stamp 119 may include one or more images, which may comprise or depict a logo or name of a particular individual, group, or company, a product, good or act of service, or any other type of image. Strip 210 in the current embodiment is located at the bottom portion of the display 152; however, in other embodiments, strip 210 may be located on one or more sides of display 152 or in one or more different locations on the display 152. In the current embodiment, the strip 210 is located on the display 152 in a location that minimizes disruption of the viewer experience when viewing media content, such as movies, TV, or streaming video on the display 152. Additionally, in some embodiments, if there is not an ad stamp 119, then strip 210 may or may not be included. As can be seen in the current embodiment, the strip 210 may accumulate a number of ad stamps 119, and in some embodiments once a certain number (e.g., twenty) of ad stamps 119 are accumulated, there may be an ad stamps indicator 219 that takes the place of the certain number of ad stamps 119. In some embodiments, an operator of the engagement system 110 and/or content system 130 may charge prices for ad stamps 119, and a premium price or higher price may be charged for those ad stamps 119 that are requested or selected to be shown earlier in the sequence (before the ad stamps indicator 219 is shown).

Once the ad stamps indicator 219 is shown, a user may be able to select the ad stamps indicator 219 to see all the ad stamps 119 indicated by the ad stamps indicator 219 and other individual ad stamps 119 may begin to accumulate again. Moreover, each ad stamp 119 may be of variable or fixed size, and the same size or different sizes from one another. Also, each ad stamp 119 may be shown for a fixed or variable period of time. For example, each ad stamp 119 may be shown for a certain period of time (e.g., minutes, hours, or days), or in some embodiments, each ad stamp 119 may be shown for a variable period of time (e.g., based on the type of content advertisement or ad stamp, time of day, day of the week, or other information associated with the user, among others). In certain embodiments, the use of the ad stamps 119, the strip 210, and/or the ad stamps indicator 219 enables numerous advertisements to be shown to the viewer, thereby building brand or product awareness, with minimal intrusion on the viewer experience.

Card ad 139, seen in FIG. 2, may be advertisements, information and options regarding other content, or other information that is captured (e.g., shown or recorded) while content is captured. For example, many content providers (e.g., MSOs, distributors, and/or broadcaster) will advertise their own programming or additional advertisements and information at the bottom or side of the display 152 when content is being broadcast or otherwise captured, and card ads 139 may include such advertising and information. In some embodiments, a card ad 139 may transition to an ad stamp 119 (by minimizing or other ways), and in some embodiments, a lead ad 138 may transition to a card ad 139, and the card ad 139 may transition back to a lead ad 138 or to an ad stamp 119.

Figure 3:
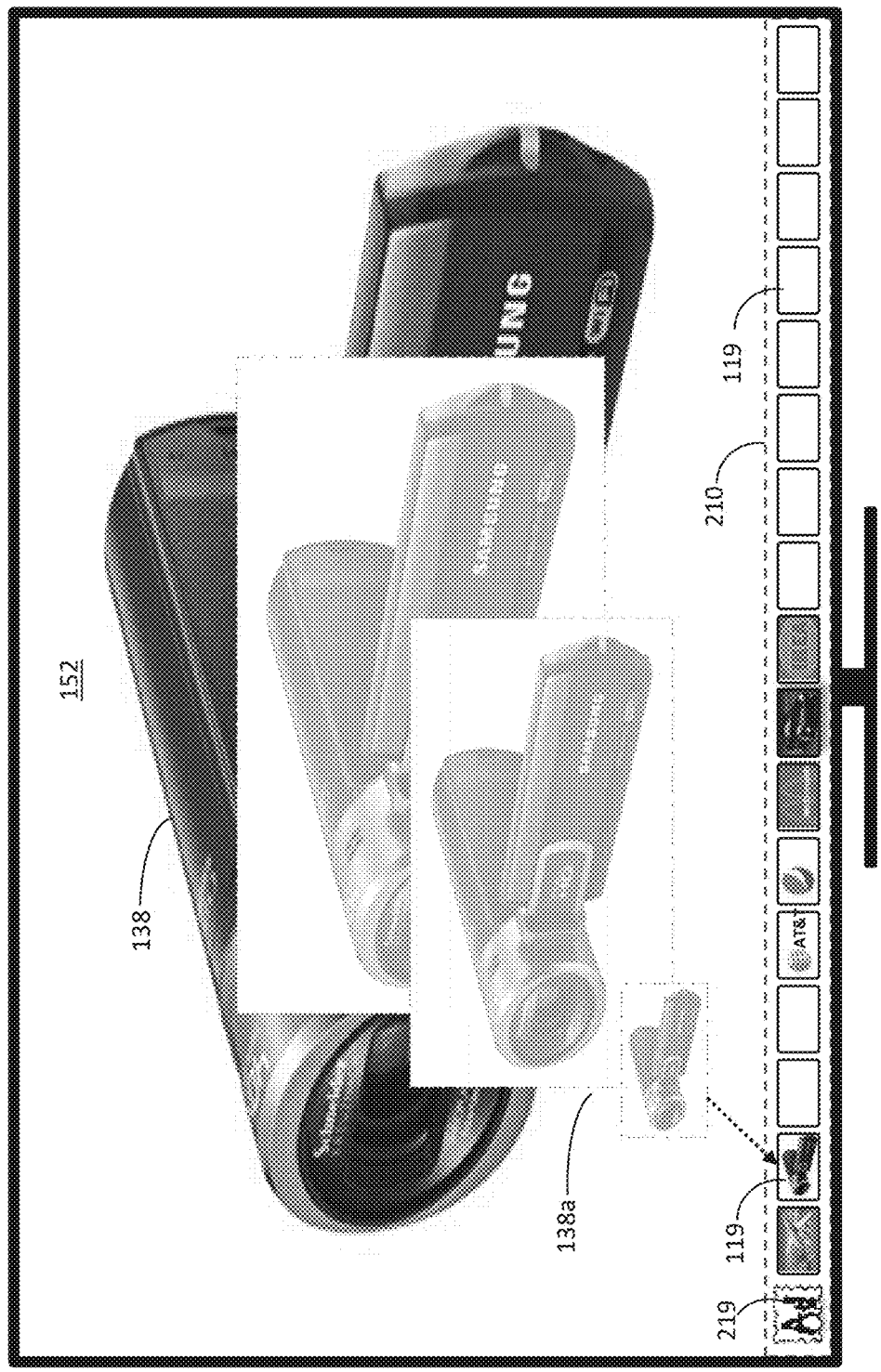
FIG. 3 is an exemplary diagram of a lead ad, minimizing lead ad, ad stamps, and strip on the display of the advertisement system of FIG. 1.

FIG. 3 shows the lead ad 138 and a minimizing lead ad 138a on the display. The minimizing lead ad 138a indicates a transition of an advertisement from the lead ad 138 to the ad stamp 119 after a period of time (e.g., the period of time for the lead ad 138 to complete). Many broadcasters, distributors, and/or MSOs include advertisements in thirty second blocks of time, and in some embodiments, the lead ads 138, card ads 139, or advertisement placements ("ad placement") 438 (discussed below), collectively content advertisement, may be shown for any period of time that is divisible by, or a multiple of, thirty seconds. However, in other embodiments, content advertisements may be shown for other periods of time (e.g., not divisible by or a multiple of thirty seconds). Content advertisement may include one or more lead ad 138, one or more card ad 139, and/or one or more advertisement placement 438.

Further, content advertisements and ad stamps 119 may, in some embodiments, be associated with entertainment content provided by the broadcasters, distributors, and/or MSOs (i.e., content system 130). For example, broadcasters, distributors, MSO, and/or individuals or groups associated with the engagement server 110 and/or content server 130 may label or otherwise correlate a program, show, movie, or other content with an icon (e.g., shown as a content advertisement) that may be shown on the display 152. The icon may notify the user that the content may be viewed now, may be or is being saved or recorded on the user system 150 or remotely (e.g., engagement system 110), and/or notify the user the content may be viewed on demand now or at a later time. By selecting the icon, the user may transition the content to an ad stamp 119 and/or as a storefront (seen as 519 in FIG. 5) in the user profile 510. In some embodiments, when the user selects the storefront 519 or ad stamp 119 associated with the content, the content may be viewed or other options may be provided to the user regarding the content (e.g., remind later, save the content to another location, among others). In some embodiments, the examples and options provided above regarding saving content are not required, and other variations and combinations may be used. In some embodiments, ad stamps 119 may include applications or other types of indicators that enable a user to efficiently work on or view selected material. For example, in some embodiments, a user may be enabled to select one or more ad stamps 119 to be shown on the strip 210 (e.g., the user may select the one or more ad stamps 119 from the user profile 510), and the ad stamps 119 may include ad stamps 119 that enable the user to check the weather, interact with their email, view news, or connect to social media, among others. In some embodiments, the user, by the use of the control device 160 may be enabled to select an ad stamp 119 by a single selection on the control device 160. However, in other embodiments, such a configuration is not required.

In other embodiments, a period of time for content advertisement may be defined by the content system 130, user system 150, and/or engagement system 110. The defined period of time may be the length of each content advertisement to be shown, which may be determined based on stored lengths of time for each content advertisement, or time stamping processes used to determine the length of time for each content advertisement, among others. For example, a length of time determined based on stored lengths of time may include storing the lengths of time in memory 134 or 156 of the advertisement server 132 or client server 154, respectively. Additionally, in another example, by using a time stamping process, the content system 130 or user system 150 may store a time stamp for when a content advertisement is captured the first time or any additional time, and the time stamps, or calculated length of time based on the time stamps, may be stored in any portion of memory in advertisement system 100. Further, the period of time may be a fixed or variable period of time to show the content advertisement. The fixed or variable period of time may be determined by the day of the week, time of day, channel being captured (e.g., shown or recorded), programming captured, or information relating to a particular user's preferences and purchase history, among others.

With respect to FIG. 3, after the lead ad 138 is shown for a period of time, as discussed above, the minimizing lead ad 138*a* will transition the advertisement from the main area of the display 152 to the strip 210 and utilize the ad stamp 119 for the advertisement. As depicted in the current embodiment (FIG. 3), more than one minimizing lead ad 138*a* may be shown on the display 152 to transition the lead ad 138 to the ad stamp 119. In other embodiments, one minimizing lead ad 138*a* is shown; in other embodiments, no minimizing lead ad 138*a* is shown. The minimizing lead ad 138*a* may include one or more images, which may comprise or depict a logo or name of a particular individual, group, or company, comprise an image or video frame depicted at any point during the lead ad 138 or the last image or video frame depicted during the lead ad 138, or comprise or depict a picture of a good, product or act of service, or any other type of video frame or image. The broadcaster, distributor, controller of the engagement system 110, individual, company, or group that is represented by the advertisement or that paid for the advertisement, or some other individual or group associated with the advertisement may select one or more images that may appear in the lead ad 138, minimizing lead ad 138*a* and ad stamp 119. Additionally, the image(s) or video frame(s) that appear in the lead ad 138, minimizing lead ad 138*a*, and ad stamp 119 may be the same image(s) or video frame(s) or different image(s) or video frame(s) from one another. Further, card ads 139 (seen in FIG. 2) may also transition to ad stamps 119 on the strip 210 by the minimizing effect described in relation to minimizing lead ads 138*a* or any other way of transitioning.

Additionally, in some embodiments, the advertisement system 100 may recognize if each lead ad 138 was owned and distributed by the content broadcaster or distributor, and report the list to the content system 130 or engagement system 110. It may be typical that the content broadcasters owns the time slot and/or advertising window when the display 152 is tuned to an associated TV channel, and often the broadcaster may not allow the distributor/MSO to modify or add to the image on the screen (except when permitted by the broadcaster). Often, broadcasters own all the commercial or ad space, inventory, and ad breaks within their content broadcasts. In some embodiments, to accommodate the MSO's generation of revenue from advertising, when the broadcaster and MSO agree to share ad revenue, broadcasters often allocates a certain number of ad space inventory to be sold and filed by the MSO. In this case the broadcaster broadcasts "filler ads" in the MSO designated ad space/inventory during preset ad breaks, and then allows the distributor to over lay distributor sold ads when/if the distributor has sold the designated ad space/inventory. If the distributor had not sold the designated ad inventory the filler ads will appear on the user's display 152 by the use of the user system 150. In some embodiments, the advertisement system 100 may recognize when it is optimal to provide filler ads or if the advertisement space has been sold.

Figure 4:
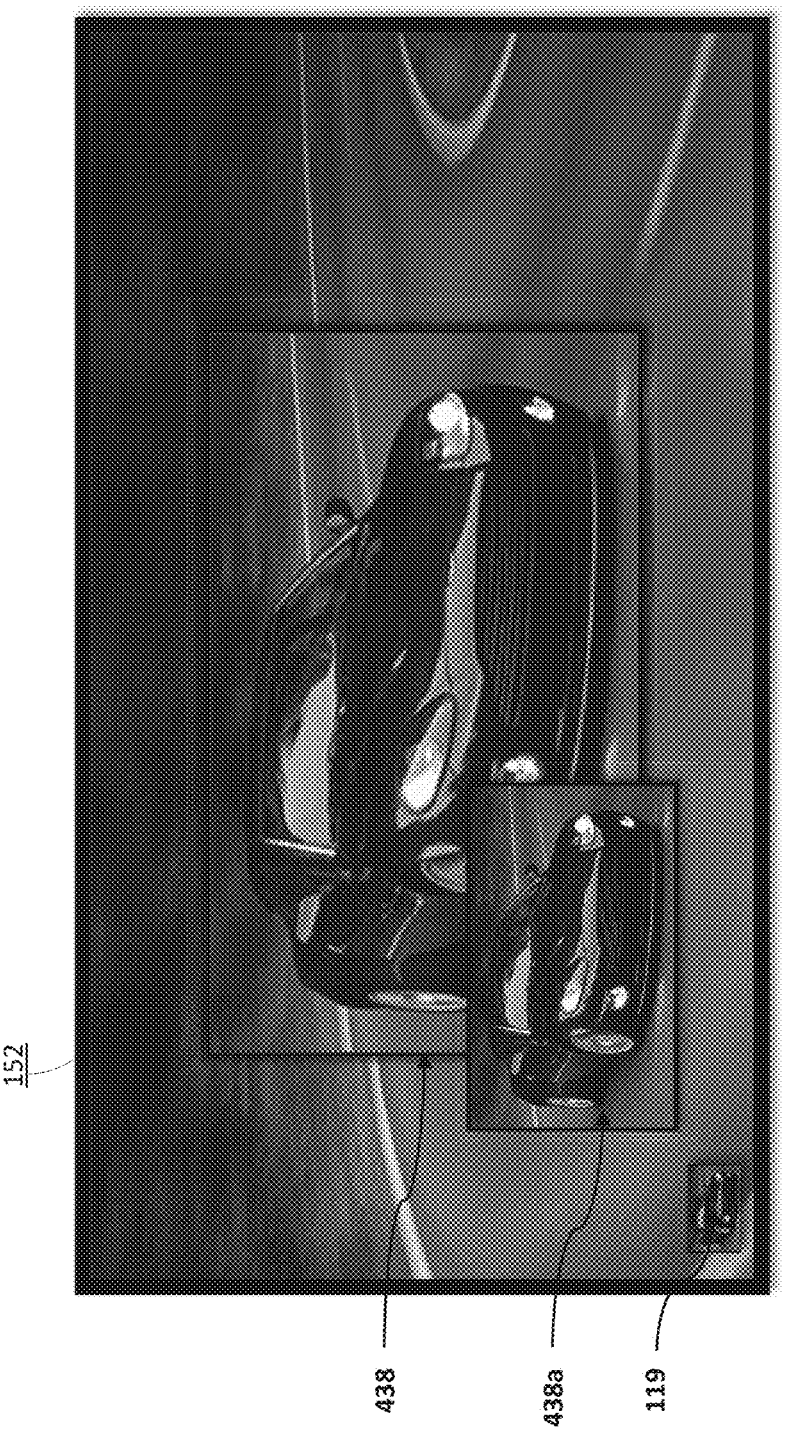
FIG. 4 is an exemplary diagram of an advertisement placement, minimizing ad placement, and ad stamp on the display of the advertisement system of FIG. 1, in accord with one embodiment of the current disclosure.

FIG. 4 shows an ad placement 438 transitioning to an ad stamp 119. Ad placements 438 may be any type of good or service depicted on display 152 by the user system 150 from content system 130, and ad placements 438 are shown during the scheduled content programming (e.g., the content provided from content server 140). For example, ad placements 438 may be a placement of a good or service in programming on the content system 130. As shown in FIG. 4, for example, a car may be depicted in the content of programming, and an ad stamp 119 may be associated with the car. FIG. 4 shows a minimizing ad placement 438*a* transitioning the ad placement 438 to an ad stamp 119, similar to that shown in FIG. 3. A minimizing ad placement 438*a* is not required, and in some embodiments, the ad placement 438 may be transitioned directly to a storefront 519 without an ad stamp 119.

Figure 5:
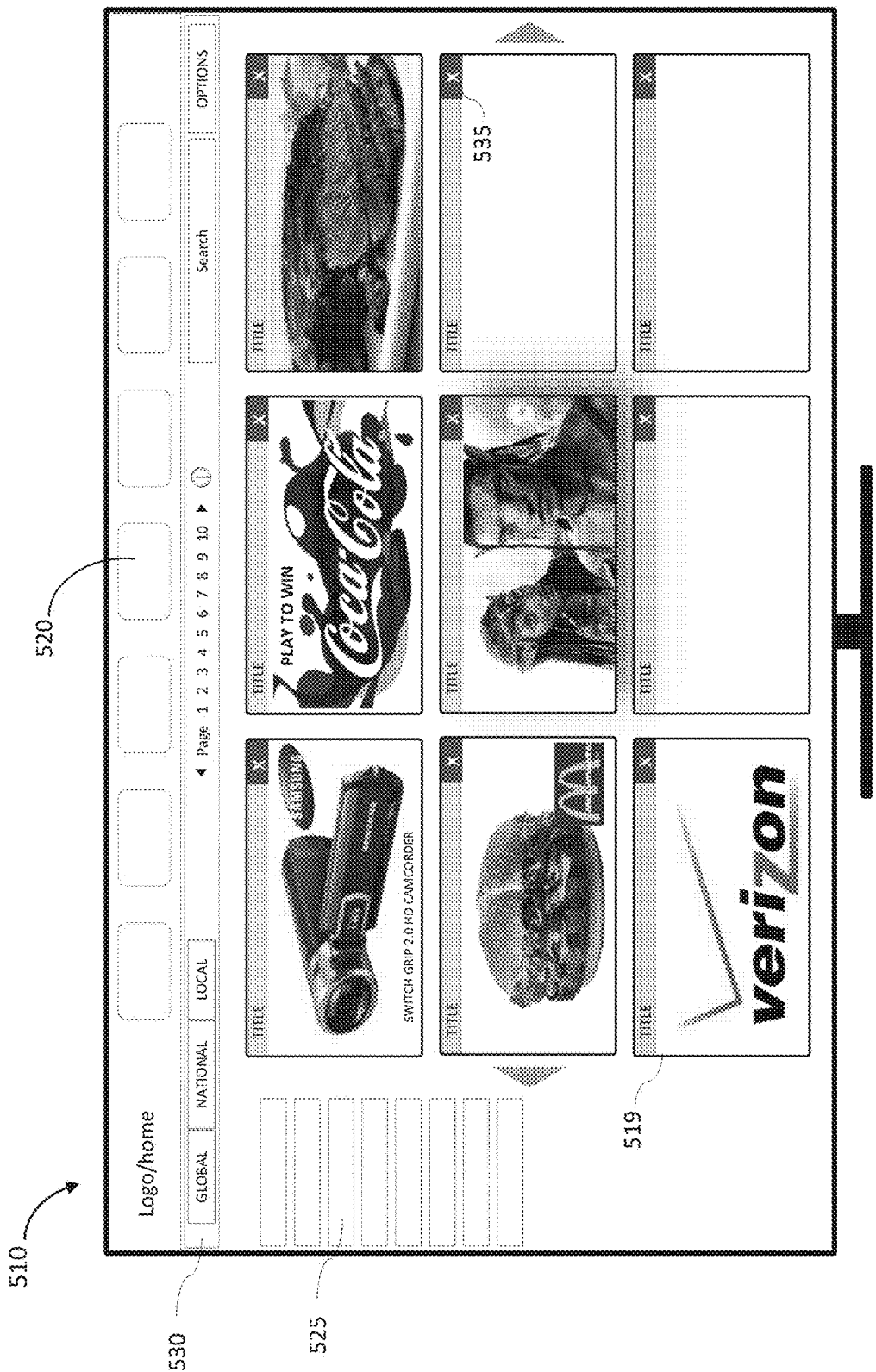
FIG. 5 is an exemplary engagement ad interface associated with the user profile on the display of the advertisement system of FIG. 1, in accord with one embodiment of the current disclosure.

FIG. 5 shows an interface for a user profile 510. The user profile 510 may be accessed in a multitude of ways, including, for example, the user selecting an ad stamp 119 or the strip 210 with the control device 160, the user selecting a particular option or button on the control device 160 to bring the user to the user profile 510, or the user system 150 automatically causing the display 152 to depict the user profile 510 after one or more condition(s) are met. The user profile 510 may be stored at any location or multiple locations within the advertisement system 100, including engagement system 110 and user system 150.

In some embodiments, the engagement ad 118 (described below) for each, may be downloaded, or otherwise received, by the user system 150 from the engagement system 110 after a period of time of showing the content advertisement; however, in some embodiments, engagement ads 118 may be stored on the user system 150 at a predetermined time (e.g., each day or at the time the user system 150 was set up) where the engagement ads 118 are downloaded or received by the user system 150 from the engagement system 110 once the user profile 510 is accessed. Also, ad stamps 119 may be downloaded by the user system 150 from the engagement system 110 at predetermined times, before or after content advertisements are complete, or before content advertisements are shown, among others. In some embodiments, each engagement ad 118 is streamed from the engagement system 110 when the user selects that particular engagement ad 118. Additionally, in some embodiments, there may be a combination of the different ways listed above, and there may be other ways not listed or described above, for downloading or otherwise receiving content advertisement.

Once the user profile 510 is accessed or otherwise shown, a user may select the ad stamps 119 associated with an engagement ad 118, if available, as shown in FIG. 5. A user profile 510 may include categories 520 and 525 of ad stamps 119. The ad stamps 119 may be shown as storefronts 519 once the user profile 510 is accessed. At the same time, or during, the transmission of the ad stamps 119 in the advertisement system 100, the data and information required for its respective storefront 519 may be transmitted along with the ad stamp 119. However, in some embodiments, a content advertisement may save and include a storefront 519 in the user profile 510 without an ad stamp 119 being associated with the storefront 519. In these embodiments, the storefront 519 may be transmitted in the advertisement system 100 in a similar way to the ad stamps 119. For example, once a user accesses their user profile 510, the user system 150 may pull or the engagement system 110 may push the content and information associated with each storefront 519 that has not been downloaded. However, in some embodiments, the storefront 519 may be streamed, downloaded at preset times, downloaded at times when the storefront 519 is determined to be added to the user profile 510, among others.

Storefronts 519 may include a depiction of an image similar or different to the image shown in the ad stamps 119, and in some embodiments, storefront 519 may include a video clip or other type of moving image. As shown in categories 520 and 525, the engagement system 110 and/or user system 150 may sort the ad stamps 119 into different categories to enable the user to better access and sort the ad stamps 119. In some embodiments, categories 520 and 525 may include subcategories. For example, the categories could be based on criteria such as time of broadcast, type of product or service associated with the ad (e.g., tax services, cars, travel, sports, etc.), duration of ads, expired ads (ads for events or items that have already occurred or are no longer available), viewed ads, among others. In some embodiments, the user may be able to select the categories, alter the categories, and add and delete categories from categories 520 and 525.

Selection strip 530 enables the user to sort and select the storefront 519 based on geographic scope, seen in scope 530a with the options of Global, National, or Local, among others. However, other geographic options may be included, and in some embodiments, there may be no geographic locations to choose from. Also, selection strip 530 may include an option to sort based on a list of pages, seen in page options 530b, enter a search request in a search bar 530c, or options menu 530d, which in some embodiments may enable a user to adjust or modify settings. For example, users may be able to adjust their profiles or interests, pair devices to the engagement system 100, set parental controls, set the number of pages that are pulled up in each search, select the number of storefronts shown per page (described below), adjust colors, change category preferences, add or merge user profiles within a single residence, set location, zip code, or other location parameters, or set friends networks, among others. Additionally, in some embodiments, a geographic scope 530a, page listing 530b, search bar 530c, or options menu 530d may not be included, or in some embodiments, other options, selections, or variations may be included with regard to 530a, 530b, 530c, and 530d. Further, in other embodiments, additional or selections may be included in selection strip 530.

The number of storefronts 519 per page may be defined by a component of the advertisement system 100 or the user, among others. Additionally, as seen in the top corner of the storefront 519 in FIG. 5, the user may delete a storefront 519 by selecting the delete icon 535. The categories 520 and 525 and delete icon 535 are not required, and the number and location of the categories 520 and 525 and delete icon 535 are not required in the number or position as indicated in FIG. 5, as they may be in different number or locations and the location and size may vary for each ad stamp 119.

The engagement system 110, content system 130, and/or user system 150 may store in any memory of advertisement system 100 information related to the user and relate the saved information to the user profile 510, such as ad stamps 119 or storefronts 519 associated content advertisements that were broadcast, downloaded, recorded, streamed, or otherwise received by the user device 150, a list of the ad stamps 119 or storefronts 519 the user selected, a list of the engagement ads 118 the user viewed and the length of time the user viewed each engagement ad 118 (or other type of content advertisement), and a list of the user's ecommerce activities within the user profile 510, among others. Also, the user may be enabled to manage the user profile 510, including deleting old or undesirable storefronts 519, ad stamps 119, and/or content advertisements, shifting storefronts' 519, ad stamps' 119, and/or content advertisements' positioning, setting storefronts' 519, ad stamps' 119, and/or content advertisements' priorities, requesting to be excluded from being shown certain types of ads, products or activities, saving certain storefronts 519, ad stamps 119, and/or content advertisements, viewing storefronts 519, ad stamps 119, and/or content advertisements, or organizing storefronts 519, ad stamps 119, and/or content advertisements according to categories, among others.

Also, in some embodiments, individuals, groups, or corporations unassociated with advertisements may be enabled to create storefronts 519, ad stamps 119, or content advertisements to be shown to the users. For example, a child of an elderly person, nurse, doctor or other service provider could be permitted, by the advertisement system 100 to place storefronts 519, ad stamps 119, or content advertisements on the elderly person's user system 150, whereby the elderly person would then be enabled to quickly make a selection to engage the storefront 519, ad stamp 119, or content advertisement provider instantly in communication (e.g., telephone or video conversation) to reach out for help or perform other activities. The user could place an icon for a new application, such as calendar, contacts lists, email, video conferencing, cooking recipes, health related information, directories, pictures, quick access to ecommerce (such as ordering medicine refills, pizza or other food deliveries), emergency services, friends or family direct contact, etc. The stamp also could be set to become part of the user profile 510. Also, there may be multiple other applications for individuals, groups, or corporations unassociated with advertisements to create storefronts 519, ad stamps 119, or content advertisements.

In some embodiments, when an ad stamp 119 or content advertisement is shown, a user may be enabled to select to purchase the service or good that is depicted on the display 152 of the user system 150 by the use of ecommerce. In some embodiments, a user may be enabled to use a pointer associated with a control device 160 to select different items or indicated services shown on the display 152 by the user system 150, to find out more information associated with the item or service and/or purchase the item or service (if these options are available). In some embodiments, a user, by the use of the control device 160, may be enabled to select to purchase a good or service that is shown in an ad stamp 119, content advertisement, storefront 519, or any other location on the display 152 by a selection made by the user on the control device (e.g., the user may only have to select one button or one touch on a touch screen in order to purchase a good or service depicted on the display 152). The user may only have to input their payment information, delivery location, and other necessary information one time in the user profile 510, and in some embodiments, the advertisement system 100 may be enabled to export the user's information to the user system 150 or other part of the advertisement system 100 from another location.

Figure 6:
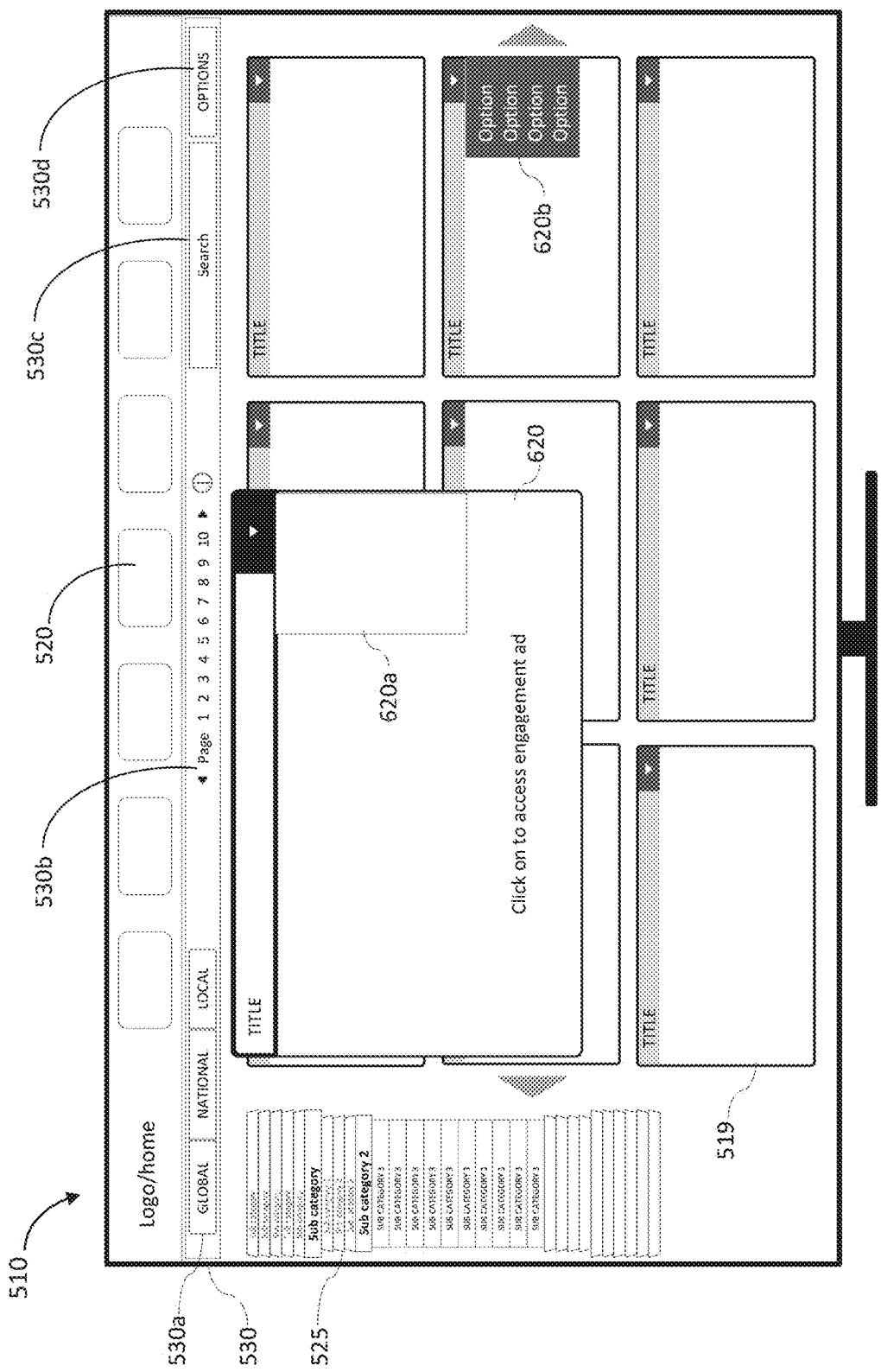
FIG. 6 is an exemplary user profile with a pop-up and options selections on the display of the advertisement system of FIG. 1, in accord with one embodiment of the current disclosure.

FIG. 6 shows the user profile 510 of FIG. 5 with a pop-up interface 620 that appears when a user, using control device 160, places a pointer or otherwise navigates selections on the display 152. Pop-up interface 620 may appear when a user hovers over or otherwise selects a particular store front 519 (associated with an ad stamp 119). The pop-up interface 620 may show a short video, advertisement, or content preview related to the respective storefront 519. However, in other embodiments, the pop-up interface 620 may depict a still image or other type of image or logo. As can be seen, in the current embodiment, when the pop-up interface 620 is shown, the user is still able to see some, or at least a portion, of the surrounding storefronts 519 shown on the particular page. Although the surrounding store fronts 519 may be seen in the current embodiment, such a configuration is not required.

Also, in some embodiments, if the user hovers over or otherwise selects the arrow or other identification indicated as options 620*a*, the pop-up interface 620 will display different options that are available for the user. Options 620*a* is not required, and in some embodiments, options 620*a* may include a different symbol of the options and may be in a different location from that depicted in FIG. 6. Options 620*a* may include options of, for example, mark content/storefront, customize, send to mobile, send to friend, among others. If mark content/storefront is selected, then the user profile 510 stores the marked content. If customize is selected, the user may be enabled to modify the pop-up, choose to not see a particular pop-up in the user's user profile, see more of a particular category associated with a particular pop-up, among others. If send to mobile is selected, the advertisement system 100 uses information provided by the user or otherwise saved related to the user in order to send the information (e.g., a link, ad stamp 119, or content advertisement, among others) via text message, SMS, email, software application, or any other known method to the user's or another's mobile device. If send to friend is selected, the advertisement system 100 uses information provided by the user, previous information supplied regarding information sent to another, or otherwise information saved related to another on the user's user profile or another's user system 150 in order to send the information (e.g., a link, ad stamp 119, or content advertisement, among others) via any other known method to another (e.g., via mobile device, user system, tablet, or other electronic device). Additionally, in some embodiments, if a user hovers over or otherwise selects the indicator labeled option 620*b* of the storefront 519, then the options provided in options 620*a* may drop down or otherwise appear in the storefront 519 of the selected options 620*b*. However, in other embodiments pop-up interface 620, options 620*a* and/or 620*b* may not be included, and in some embodiments, options 620*a* and 620*b* may be located in different locations, include different indicators, and/or include different options from one another.

Further, the engagement system 110 and/or user system 150 may collect anonymous and/or public user data regarding interactions with the content of the advertisement system 100, including, for example, saved storefronts 519, ad stamps 119, and/or content advertisements, clicked on storefronts 519, ad stamps 119, and/or content advertisements, viewed storefronts 519, ad stamps 119, and/or content advertisements, and the duration of the view of each engagement ad 118, what broadcast channel the ad stamps 119, and/or content advertisements associated lead ad 138 came from, and the time it was served, among others. Additionally, the advertising system 100 could offer additional storefronts 519, ad stamps 119, and/or content advertisements performance measurements, such as, for example, if users interact more with storefronts 519, ad stamps 119, and/or content advertisements with celebrities (or certain celebrities in them), if users interact with automobile storefronts 519, ad stamps 119, and/or content advertisements containing red cars more than other colors, among others. The advertisement system 100 may track preferences and history for each user that may be stored in any component of the advertisement system (e.g., engagement system 110, content system 130, user device 150) regarding the types of storefronts 519, ad stamps 119, and/or content advertisements or products and services the particular user likes based on their engagement behavior with the collection of storefronts 519, ad stamps 119, and/or content advertisements in their user profile 510. Based on information tracked, the engagement system 110 or other component of the advertisement system 100 may select, or otherwise recommend, what type of storefronts 519, ad stamps 119, and/or content advertisements should be served later to that particular user.

As previously mentioned, in some embodiments, the advertisement system 100 may be capable of monitoring user interactions with storefronts 519, ad stamps 119, and/or content advertisements and provide recommendations, based on information such as the number of storefronts 519, ad stamps 119, and/or content advertisements viewed by the user, the number of engagement ads 118 the user selected, whether or not the user watched the full duration of each engagement ad 118 (or if not, the length of time the user watched the engagement ad 118 or percentage of the full time), what type of storefronts 519, ad stamps 119, and/or content advertisements the user watched fully and partially, whether the user watched or selected a storefront 519, ad stamp 119, and/or content advertisement more than once, whether or not there is a correlating factor (e.g., determining interests based on categories like sports, news, documentaries, reality television, etc.) between the storefronts 519, ad stamps 119, and/or content advertisements the user selected and watched more of and/or more than once, among others.

The advertisement system 100 enables broadcasters, distributors, and/or MSO's to keep track of and analyze what users are watching. The advertisement system 100 enables the broadcasters, broadcasters, and MSO's to keep track of what viewers are watching because at least ad stamps 119, storefronts 519, and engagement ads 119 are sent to user systems 150 based on what users are watching. Therefore, the data associated with what user's are watching may be kept track of by any component of the advertisement system 100. As such, the advertisement system 100 may be more beneficial than any other rating system (e.g., the Nielsen Ratings) because the advertisement system 100 may keep track of what is viewed by each user of the advertisement system 100, and the advertisement system 100 may have a lot of other information about the users because of information pertaining to demographics, location, viewing habits, among others.

Further, in some embodiments, storefronts 519 may be arranged to be placed, leased, or rented by an individual, company, or group that is represented by the advertisement or that paid for the advertisement, or some other individual or group associated with the advertisement. Such a lease or rental may be arranged or created by a request and information provided or other type of request by the individual, company, or group that is represented by the advertisement or that paid for the advertisement, or some other individual or group associated with the advertisement. In some embodiments, the request may be made by a selection at any location within the advertisement system 100, and the information associated with the storefront 519 may be uploaded or input in a form (e.g., a "do-it-yourself" electronic form) or application provided by the advertisement system 100. Such information and/or request may be provided to a component of the engagement system 110, content system 130, or user system 150. As previously described with respect to content advertisements, the information associated with a storefront 519 may be stored in any memory within the advertisement system 100, and transmitted, via any processor, to the user system 150 at different times or streamed. Also, the information related to each storefront 519 may be stored in the engagement system 110, the content system 130, the user system 150, or any other component of the advertisement system 100. In some embodiments, the price to lease or rent a storefront 519 may be fixed or variable, and if variable the price may be based on, for example, characteristics of a particular user (e.g., interest in a particular device, company, type of product or service, hours and time of day the user watches display 152, demographics, or other category, among others), demand for storefront 519 placements overall or based on certain time periods, the hierarchy or level of visibility for each storefront 519 (e.g., more costly to be on page 1 than page 5), the time of day or week, or viewership with respect to the user system 150 (e.g., primetime or important, highly watched, events are more costly), among others.

If a storefront 519 is leased or rented, a particular storefront 519 may be placed on a certain group of user systems 150, but the particular storefront 519 may not be placed on others user systems 150. Further, even if the same storefront 519 may be on more than one user's user system 150, the location and even content of the storefront 519 may be different on all user's user systems 150. Such determinations may be made by the engagement system 110, as previously described, and information obtained about the user with respect to the user profile 510 (e.g., user's viewing habits, likes, interests, purchases, demographics, etc.). For example, the engagement system 110 may enable the individual, company, or group that is represented by the advertisement or that paid for the advertisement, or some other individual or group associated with the advertisement to better use, or optimize, their advertising dollars for renting or leasing storefronts 519 based on the amount of money they will spend and the individualized information that may be accessible about any particular user. However, in some embodiments, different storefronts 519 may not be provided to the user system 150, and each user system 150 may be configured to have the same or substantially similar storefronts 519 in the same locations of the user profile 510. In some embodiments, the storefronts 519 may be regionalized or grouped among broader categories. When a user selects a storefront 519, the pop-up interface 620 may appear, and in some embodiments, a user may be able to select to see the engagement ad 118 and engagement ad interface 710 after display of the pop-up interface 620 or without the display of the pop-up interface 620. In some embodiments, different parameters may be used when storefronts 519 are leased or rented, and in some embodiments, the storefronts 519 may not be leased or rented.

Figure 7:
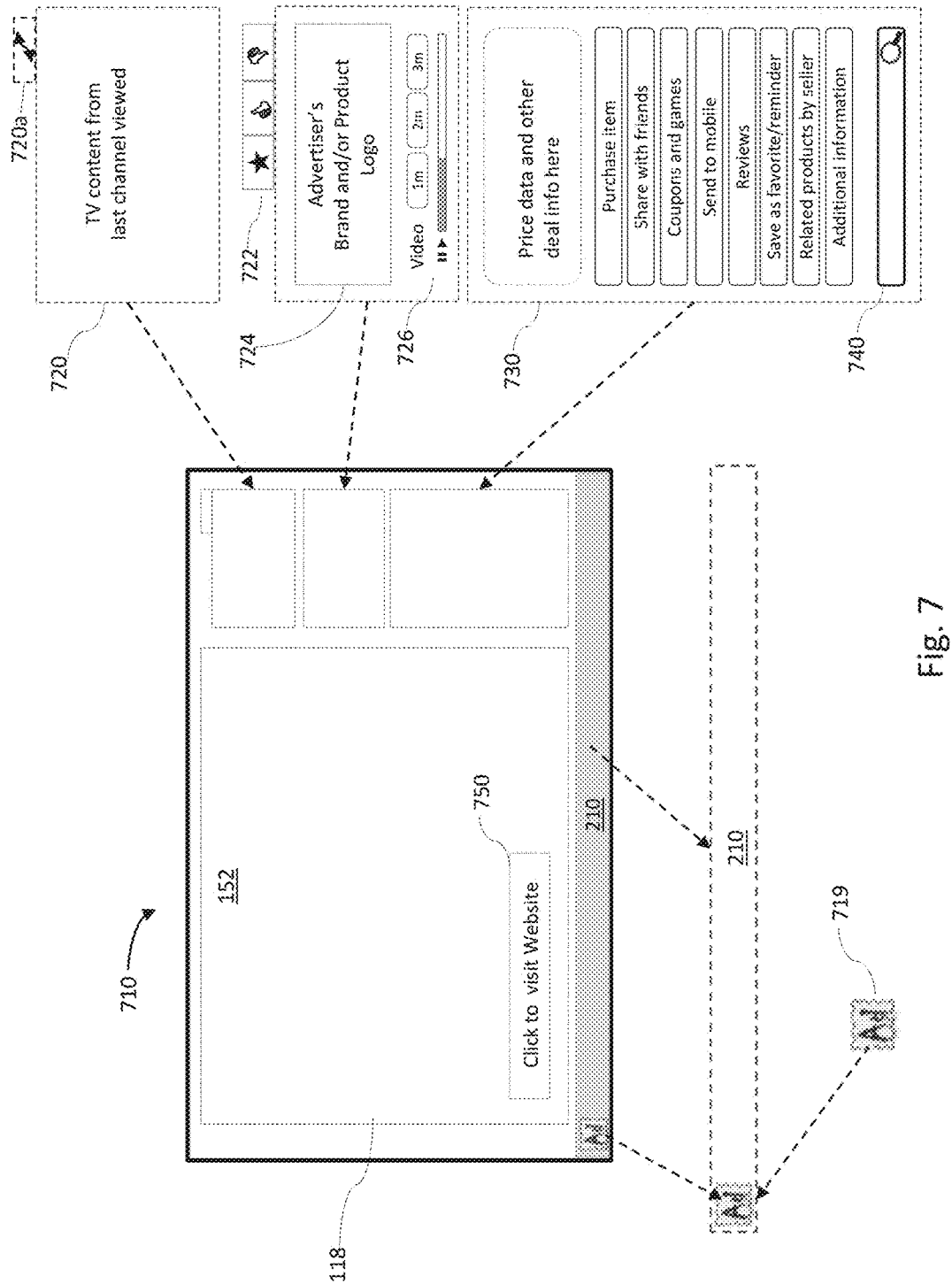
FIG. 7 is an exemplary user profile on the display of the advertisement system of FIG. 1, in accord with one embodiment of the current disclosure.

FIG. 7 shows an engagement ad interface 710, which includes an area on the display 152 for an engagement ad 118 to be shown, which may vary and change. The engagement ad 118 may be automatically selected or manually selected by the user from the ad stamps 119 of the user profile 510, as shown in FIG. 5. On the side of the strip 210, a profile icon 719 may be provided. The shape, icon, and location of the profile icon 719 is not essential, and any other shape, icon, or location may be used. Also, in some embodiments, the profile icon 719 is not provided. If the user selects the profile icon 719, the user system 150 will be modified to display the user profile 510 on display 152 of FIG. 5. Engagement ad interface 710 may also include a content box 720 that would enable a user to see the content that is provided from the content system 130 to the user system 150 (i.e., the programming that is on the channel the user has selected to be received and displayed). Additionally, toggle 720a may be provided, which enables the user to switch to a full screen display of the content in content box 720 on the display 152. In some embodiments, after the content of content box 720 is displayed in full screen on display 152, a toggle 720a may also be provided at some location on display 152 for a fixed or variable period of time to enable the user to return to engagement ad interface 710.

Engagement ad interface 710 may also include an interest section 722, which may include options for the user to interact and select whether they are interested (e.g., thumbs up icon) or uninterested (e.g., thumbs down) in the engagement ad 118, and interest section 722 also enables users to mark the engagement ad 118 as a favorite (e.g., the star symbol) and delete the currently displayed engagement ad 118. Engagement ad interface 710 may also include engagement ad information 724, which may include a logo or other product/service identification, and a video tool 726. Video tool 726 enables the user to select a video about the product/service in the engagement ad 118 that lasts different lengths of time or covers different aspects of the product/ service in the engagement ad 118. Also, video tool 726 may include a video measurement tool that indicates the length of the video and how much of the video has been watched at a given time. All such information can be logged in the user system 150, advertisement system 110, the user profile 510, or a combination thereof, and such information may be used by the person, group, or company that logs the information or passed along and/or sold to other persons, groups, or companies that may find the information valuable (e.g., target advertising).

Engagement ad interface 710 may also include an information section 730 that enables the user to do a multitude of things, including selecting from additional options. For example, information section 730 may include an option for the user to obtain price information associated with the engagement ad 118 product or service, an option for a user to purchase the product or service by the use of ecommerce. The ecommerce option may be a link to an application or uniform resource locator (URL) directing the user to a website provided by a third party (e.g., direct the user to Amazon or other online retailers); however, in some embodiments, the engagement system 110, content system 130, and/or user system 150 may provide a program or system to the user in order to complete an ecommerce transaction. In some embodiments, a digital wallet may be saved to the user profile 510 where the user may be able to save their payment information (e.g., credit card) to enable the user to order items or services without providing their payment information multiple times (e.g., a "quick action" button). Such an option enables the user to act quickly and get back to viewing content thereafter, or to act quickly to order product/service in cases when the product/service is being auctioned, or where there is a limited supply, or offered only to the first (number) of consumers that apply. In some embodiments, the individual, company, or group that is represented by the advertisement or that paid for the advertisement, or some other individual or group associated with the advertisement may have the ability to change an offering of or certain features of the supplied ecommerce at the time of designing the engagement ad 118 and ad stamp 119. Also, in some embodiments, after the engagement ad 118 and/or ad stamp 119 are created, changes may occur by a selection made from a list of offered features and tools provided by the engagement system 110, or otherwise, by requesting the addition of other features and tools.

Additionally, information section 730 may include an option to share information associated with the engagement ad 118 product or service with friends, an option to use coupons or play games associated with the engagement ad 118 product or service (e.g., user can use the coupons to purchase or play games provided by the person, group, corporation, or associated entity in order to win discounts or free items), an option to send information associated with the engagement ad 118 product or service to another user's or another's mobile or smart device, an option to see reviews or conduct a review of a product or service, an option to save as favorite/reminder, an option to find related products or services, an option to obtain additional information, and an option to conduct a search using a search box 740. Such options in the information section 730 are not required.

Some may not be included in the information section 730, and additionally, some options not disclosed above may be included.

Further, in some embodiments, a website option 750 may be included to enable the user to be directed to the web site of the individual, group, company, product, or service associated with the engagement ad 118. Moreover, the location, description, and form of each of the at least engagement ad 118, content box 720, toggle 720*a*, interest section 722, engagement ad information 724, video tool 726, information section 730, website option 750, strip 210, profile icon 719, or any other option or section on the engagement ad interface 710 is not meant to be limiting and the location, description, form, as well as more or fewer options may be provided on the engagement ad interface 710.

Figure 8:
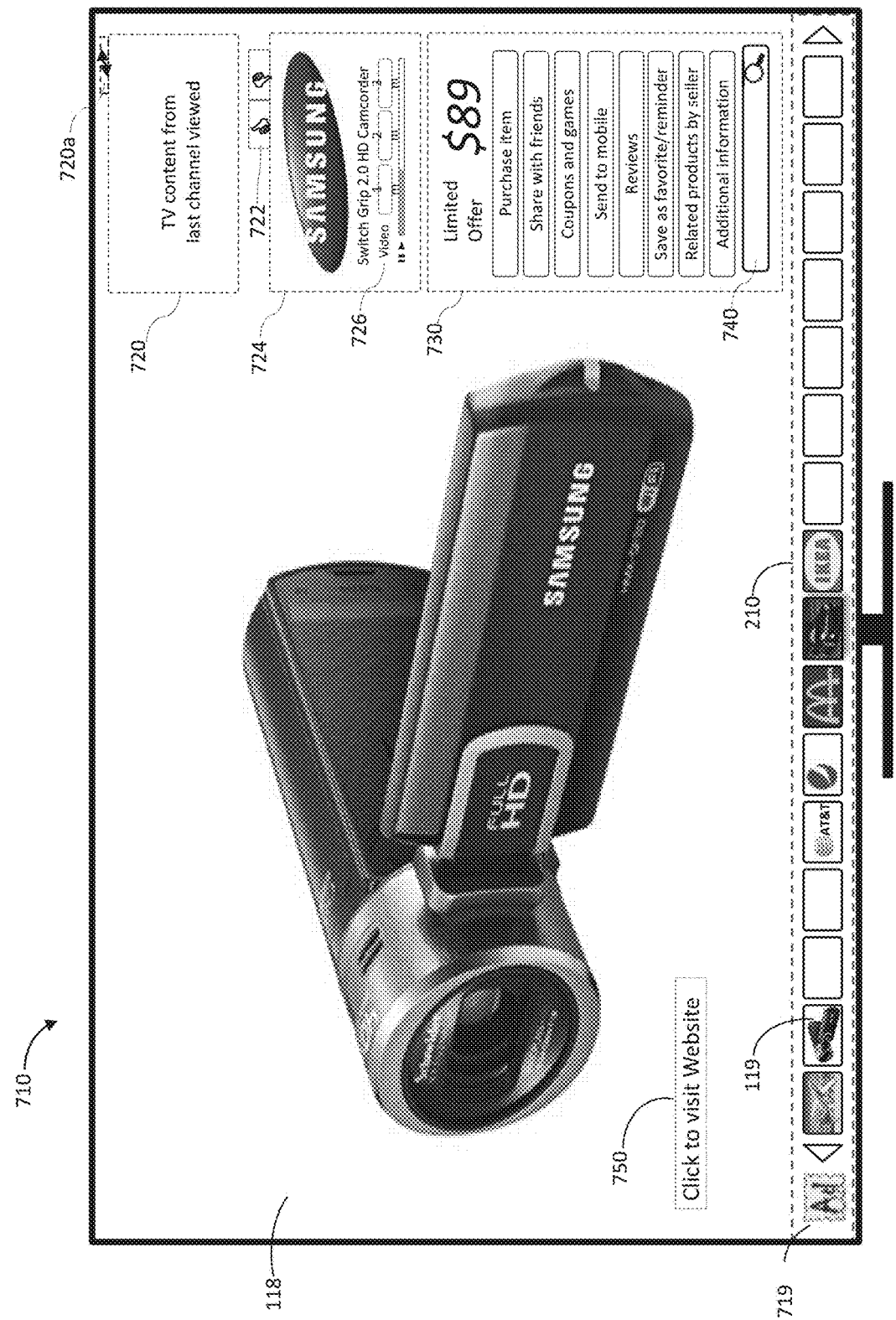
FIG. 8 is an exemplary user profile on the display of the advertisement system of FIG. 1, in accord with one embodiment of the current disclosure.

FIG. 8 shows the engagement ad interface 710 of FIG. 6; however, FIG. 7 includes an exemplary engagement ad 118 and other associated information. Additionally, in some embodiments, when additional ad stamps 119 are provided, as seen in strip 210, the user may select a new engagement ad 118 to view by selecting its associated ad stamp 119 without returning to the user profile 510.

Content system 130 and/or engagement system 110 operators may utilize the advertisement system to charge advertisers a fee for the engagement ad 118 and ad stamp 119 and the content advertisement, clicks on ad stamps 119 and viewing of associated engagement ads 118, links to full page, or partial page e-commerce or websites, among others. The costs of ad stamps 119 and engagement ads 118 may be based on a percentage of the costs of the associated lead ads 138.

Figure 9:
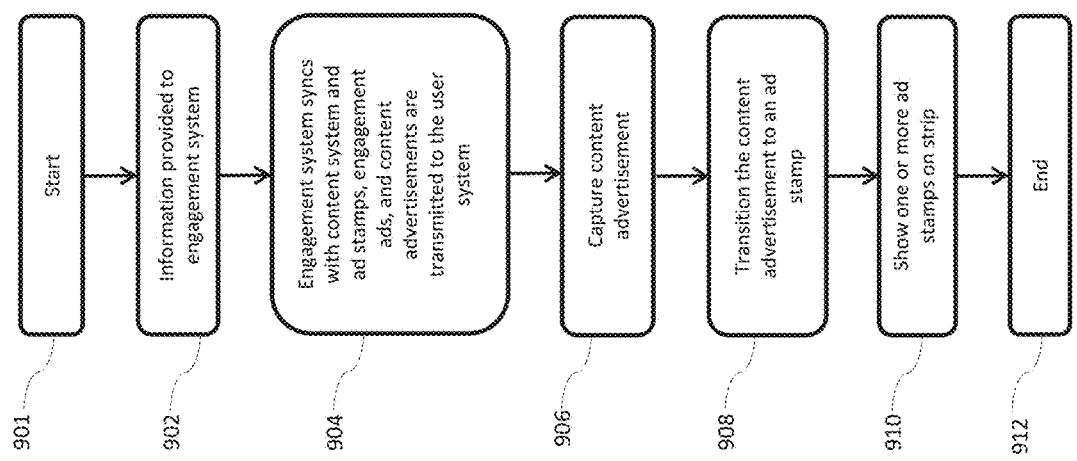
FIG. 9 is a flow diagram illustrating a method and process for displaying an ad stamp on the display of the advertisement system of FIG. 1, in accord with one embodiment of the current disclosure.

FIG. 9 shows a method and process for displaying an ad stamp 119 on the display 152. As shown in block 902, a person, group, corporation, or advertisement agency may provide or enable information to be provided to the engagement system 110 and stored in memory 114. Such information may include an engagement ad 118, an ad stamp 119 (including the icon to be displayed), a date the engagement ad 118 and ad stamp 119 should no longer be used, website information, a logo and/or name of the individual, group, or corporation, product, and/or service, a picture of the product or service, a minimizing lead ad 138*a*, categories the engagement ad 118 and ad stamp 119 would apply to, additional videos to be viewed (such as videos in 726), a website and other ecommerce sources where the product or service may be found, products or services related to the engagement ad 118 or ad stamp 119, and any additional information they may wish to provide. If the engagement ad 118 and ad stamp 119 are associated with an ad placement 438, then the individual, group, or company may provide information about the broadcast or programming the ad placement 438 occurs in and when the ad placement 438 occurs in the programming.

As shown in block 904, the engagement system 110 is synced with the content system 130, and the ad stamps 119, engagement ad 118, and content advertisements are transmitted to the user system 150. Also, the order of syncing and transmission is not required to be the same, and different embodiments may adjust and vary the order of syncing and transmitting. Syncing may occur in a multitude of ways. In some embodiments, a unique identification may be assigned to a particular engagement ad 118 and/or ad stamp 119, and the unique identification may be transmitted to the content system 130 and associated with a corresponding lead ad 138, ad placement 438, and/or card ad 139, or as a group the content advertisement (not required to include at least one of each, can be one or more of the lead ad 138, ad placement, and card ad 139). When a content advertisement is transmitted and played on a particular user system 150, the engagement system 110 may transmit the engagement ad 118 and ad stamp 119 to the user system 150 (push) or the user system 150 may request the engagement ad 118 and ad stamp 119 from the engagement system 110 (pull). In some embodiments, once the engagement ad 118 and ad stamp 119 are input and stored in the engagement system 110, the engagement system 110 may transmit the engagement ad 118 and ad stamp 119 along to the content system 130, and once the content advertisement is sent to and captured on the user system 150, the engagement ad 118 and ad stamp 119 are sent along with the content advertisement, and are thereby available for the user system 150 to display and play.

Still in some embodiments, once the engagement ad 118 and ad stamp 119 are input and stored in the engagement system 110, the engagement system 110 may transmit the engagement ad 118 and ad stamp 119 along to the user system 150 (or the user system 150 may request the engagement ad 118 and ad stamp 119 to be transmitted) at predefined times or based on information associated with what the user usually watches at certain times and days, certain programs the user records or watches, or what type of programming or channel the user is currently watching or scheduled to record or watch in the future, among others. Once the content advertisement is transmitted and played on the user system 150, the engagement ad 118 and ad stamp 119 will be stored based on a corresponding unique identification related to the content advertisement, and the engagement ad 118 and ad stamp 119 may be configured to be ready to play on the user system 150 or the user system 150 may then run a check to see if the engagement ad 118 and ad stamp 119 are stored at the user system 150.

As shown in block 906, the content advertisement may be captured (e.g., shown or recorded) at the user system 150, and once the content advertisement begins to play or record, the user system 150 may search the advertisement system 100 to find out whether or not there is an engagement ad 118 or ad stamp 119 associated with the particular content advertisement (e.g., by the methods described above relating to the unique identification, or transmitted along with the content advertisement). However, in some embodiments, this step is not required. The user system 150 may search the memory 156 of the client server 154 to clarify that the engagement ad 118 and/or ad stamp 119 are downloaded or otherwise stored at the user system 150. If the engagement ad 118 and/or ad stamp 119 are not stored at the user system 150, then the user system 150 will download, stream, or otherwise receive the engagement ad 118 and/or ad stamp 119 from the engagement system 100. In some embodiments, if both the ad stamp 119 and engagement ad 118 are not stored at the user system when the content advertisement begins to play or record, the advertisement system 100 may prioritize downloading, streaming, or otherwise receiving the engagement ad 118 or ad stamp 119 from the engagement system 110 before the other. In some embodiments, when the content advertisement is recorded, the content advertisement shown when the recorded content is played and/or viewed (e.g., from a digital video recorder that may be associated with the client server 154) may freeze or otherwise adjust (e.g., show a particular logo or item) if the user fast forwards through the content advertisement.

Block 908 indicates that once the content advertisement is shown, the user system 150 may be configured to transition the content advertisement to the associated ad stamp 119 by, for example, the use of a minimizing lead ad 138*a* or minimizing ad placement 438*a*. However, in other embodiments, the content advertisement may transition to the associated ad stamp 119 without any minimizing lead ad 138*a*, minimizing ad placement 438*a*, or other type of minimizing effect (e.g., minimizing a card ad 139 to the strip of ad stamps 119). The advertisement system 100 may be aware of when the content advertisement is complete based on timing information provided by the content server 130, or by otherwise tracking the time and knowing the length of time each content advertisement will play.

At block 910, the engagement system 110, user system 150, or other component of the advertisement system 100 may determine which ad stamps 119 to show on strip 210. As previously described, if there are more than a certain number (e.g., about twenty) of ad stamps 119 to show on strip 210, then a different icon (such as an ad stamps indicator 219) may indicate that a certain number of ad stamps 119 are saved or stored within that icon. Additionally, engagement system 110, user system 150, or other components of the advertisement system 100 may analyze which ad stamps 119 to show on strip 210 based on the channels and time the user system 150 was tuned to the one or more channels (including recordings), the current time or time the content advertisement was viewed, the dates and/or times of certain events and deals associated with the ad stamp 119 and storefronts 519, among others. Therefore, in some embodiments, if the current time is after the time and date of an occurrence (e.g., an event, deal, or other ending date and time provided by the person, group, corporation, or advertisement agency related to the engagement ad 118 and ad stamp 119), then the ad stamp 119 may not appear on the strip 210 even if the content advertisement still plays and appears.

Further, in some embodiments, the engagement system 110 may add or replace ad stamps 119, storefronts 519, and engagement ads 118 that are not associated with content advertisement that were played on programming the user watched or other recorded programming by the user. In this case, the newly added ad stamps 119 would be shown on the strip without an associated lead ad 138, ad placement 438, and/or card ad 139. Such determinations to add new ad stamps 119 may be made manually or automatically by the engagement system 110 based on, among other things, information associated with the user of the user system 150.

Figure 10:
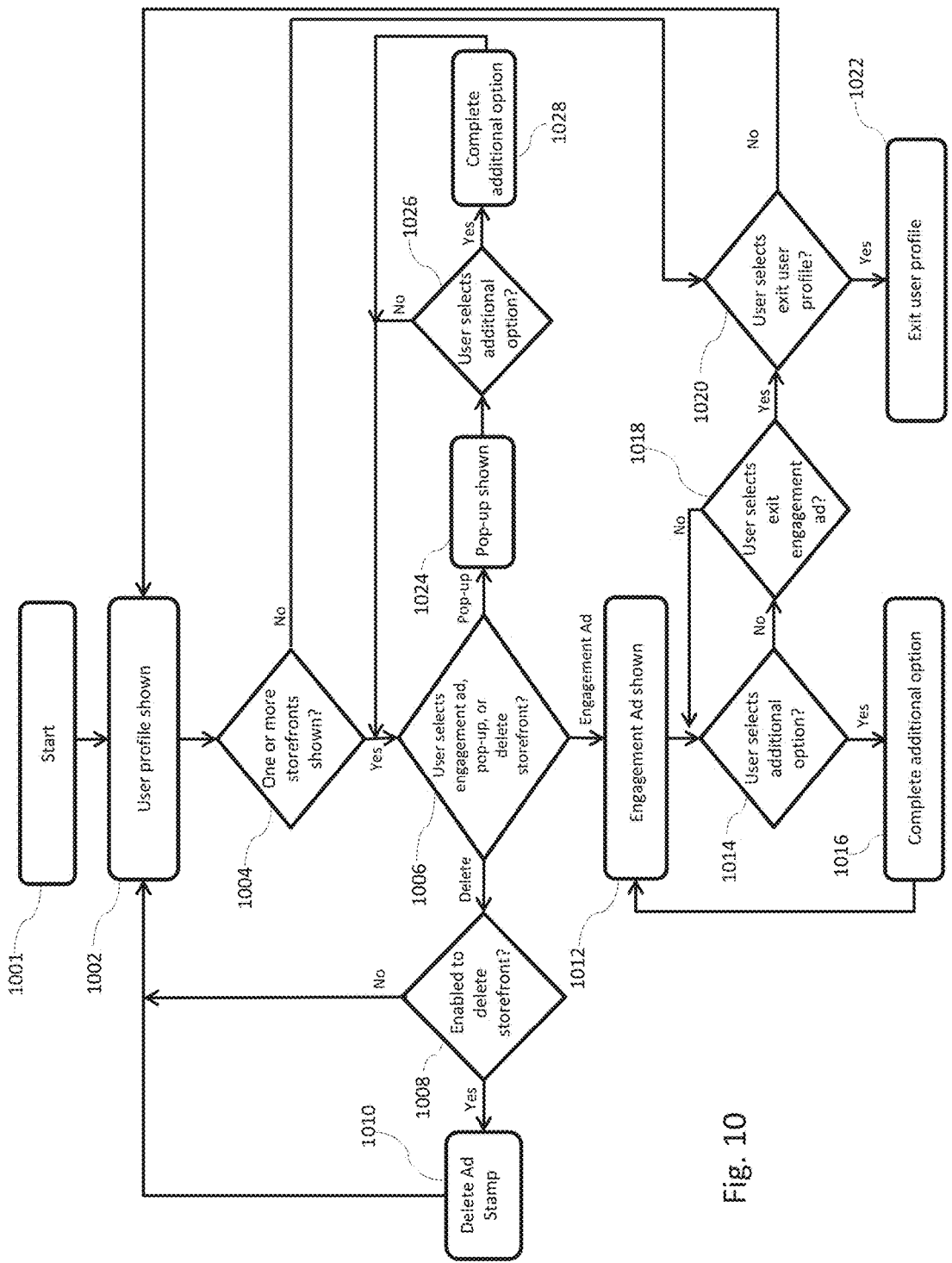
FIG. 10 is a flow diagram illustrating a method and process for accessing and utilizing the user profile, engagement ad, and associated features in the advertisement system of FIG. 1, according to various implementations of the present disclosure.

FIG. 10 shows a flow chart for the user profile 510, engagement ad 118, and associated features to be accessed and utilized in the advertisement system 110. Block 1002 indicates that the user profile 510 is shown. In some embodiments, the user profile 510 may be selected by the user, as previously described, or the user profile 510 may be automatically shown. Block 1004 indicates that the engagement system 110, user system 150, or a combination of the two may determine whether or not there are ad stamps 119 or engagement ads 118 to show. If there are not any ad stamps 119 or engagement ads 118 to view, the user may be able to select to exit the user profile 510 (shown at block 1020). When the user profile 510 is automatically shown, the user profile 510 may be the initial interface or home page for the user system 150, or the engagement system 110 and/or user system 150 may require the user to view a certain number of engagement ads 118 before the user can return to viewing the content and user recordings on the user system 150. For example, the user may be required to view five to ten engagement ads 118 per day, week, per hour of content watched, or other defined time period or condition. Additionally, the user may be prompted by the user system 150 or engagement system 110 to be able to see content or recorded content without lead ads 138, ad placements 438, and/or card ads 139 if the user agrees to watch a certain number of engagement ads 118 by a certain date and time. In some embodiments, one or more ad stamps 119 may be configured to be removed from the strip 210 after a period of time.

At block 1006, if there are ad stamps 119 or engagement ads 118 to show, a user may select to delete or view certain engagement ads 118 by selecting the ad stamp 119 associated with the engagement ad 118. If the user selects to delete certain ad stamps 119 and associated engagement ads 118 by the use of delete icon 535, the user system 150, engagement system 110, or a combination of the two may determine if the user is able to delete them, as shown in block 1008. The user system 150, engagement system 110, or a combination of the two may have certain requirements associated with them to always have a certain number of ad stamps 119 to display on the user profile 510, or not delete certain ad stamps 119, among other requirements. Therefore, in some embodiments, the user may be unable to delete one or more of the ad stamps 119 appearing on the user profile 510 based on certain conditions related to the user profile 510. If the user is able to delete the selected ad stamp 119, shown at block 1010, then the ad stamp 119 will be removed from the user profile 510. If the user is unable to delete the selected ad stamp 119, then the user profile 510 may provide a message to indicate the ad stamp 119 may not be deleted and return to the user profile 510 or just return directly to the user profile 510, otherwise returning to block 1002.

As shown in block 1012, the user may select to view engagement ads 118. A user may select to view one or more engagement ad 118 because, for example, they are required to (as described above), they receive rewards or credits for their internet/cable bill for each or each set of engagement ads 118 they view, they receive points to use as rewards for products and services, etc. After the user selects to view an engagement ad 118 by selecting the associated ad stamp 119, the engagement ad 118 is shown as in FIGS. 6 and 7.

Additionally, as shown in block 1014, after the engagement ad 118 is shown, the user may select additional options as described in FIGS. 7 and 8. If an additional option is selected, as shown in block 1016, the additional option is complete, and the user profile 510 will return the engagement ad 118 that was shown in block 1012. If an additional option were not selected, then as seen in block 1018, the user may select to exit the engagement ad 118. If the user selects to exit the engagement ad 118, then the user may select to exit back to the user profile 510, seen at block 1020, and return to block 1004. Otherwise, if the user does not want to exit to the user profile 510, then the user may return to the content of user system 150 (if enabled, as previously discussed), seen at block 1022. The exits associated with block 918 and 920 may be done by a prompt provided by the user profile 510 or by the user without a prompt, among other ways.

As shown in block 1024, the user may select or otherwise initiate the pop-up interface 620, shown in FIG. 6. After the pop-up interface is shown in block 1024, the user may select an additional option, as described and shown in FIG. 6. If the user selects an additional option, as shown in block 1026, then the additional option may be completed at block 1028, and the user system 150 may return to block 1026. However, if a user does not select an additional option, then the user system may return to block 1006.

The advertisement system 100 described above can be used to display a variety of other content types and/or images. For example (without limitations), this advertisement system 100 may be used to offer/display breaking news items or "Amber Alerts" when appropriate, where a "lead notice" similar to a "lead ad" of short duration will be broadcast and will allow a "stamp" associated with the notice/alert similar to an "ad stamp" to be displayed and become accessible to the user.

The advertisement system 100 described above, in conjunction with other available consumer info marketing data, or in conjunction with data that the advertisement system 100 may be able to about individual consumers through interactivity with the system, may be able to provide unique content to individual consumers or to target a group of consumers with similar interests. For example, advertisement system 100 could be used for personalized notifications where, for example, Facebook could send a notification to alert an individual user that information by friends was placed on the user's Facebook page. Additionally, by way of example, an engineering company that is looking to hire engineers could send a short lead ad 138 to only prospect engineers, with an ad stamp 119 that the engineers could click on to apply online for the job.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed:

1. A system for distributing media content comprising:
   an engagement system comprising a stamp server, the stamp server comprising a memory and a processor;
   a content system comprising a content server, the content server comprising a memory and a processor; and
   a user system communicatively connected to the engagement system and the content system, the user system configured to receive a stamp from at least one of the engagement system and the content system, wherein the stamp comprises an image or video frame of content represented by the stamp, and present the stamp and a stamp indicator on a display of the user system.

2. The system of claim 1, wherein the user system is further configured to present the stamp and the stamp indicator in a display strip on the display.

3. The system of claim 2, wherein the stamp is one of a plurality of stamps, and wherein the display strip includes only a sequence of the plurality of stamps.

4. The system of claim 1, wherein the stamp indicator represents a predefined number of stamps, wherein the stamp indicator is selectable by a user to view the stamps represented by the stamp indicator.

5. The system of claim 1, wherein the stamp comprises an ad stamp.

6. The system of claim 1, wherein the stamp is configured to be selectable by a user to view content associated with the stamp.

7. The system of claim 1, wherein at least one of the engagement system, the content system, and the user system are configured to store a user profile, wherein the user profile configured to be selected by a user through a control device, and wherein the user profile comprises a category and a selection strip.

8. The system of claim 1, wherein the user system receives at least one of an engagement icon, a content icon, and a storefront from at least one of the engagement system and content system.

9. The system of claim 8, wherein at least one of the engagement system, the user system, and the content system is configured to store data associated with entertainment content viewed by a user based on stored information related to activities of the user.

10. A non-transitory computer-readable storage medium having processor-executable instructions stored thereon that, when executed by a processor, cause the processor to:

receive, by a user system, a stamp and a stamp placement from an engagement system, wherein the stamp comprises an image or video frame of content represented by the stamp;

pair the stamp with the stamp placement based on a particular identification;

present the stamp on a display of the user system; and store the stamp, at the user system, based on the particular identification.

11. The non-transitory computer-readable storage medium of claim 10, having further processor-executable instructions stored thereon that cause the processor to present the stamp and a stamp indicator in a display strip on the display.

12. The non-transitory computer-readable storage medium of claim 11, wherein the stamp is one of a plurality of stamps, and wherein the display strip includes only a sequence of the plurality of stamps.

13. The non-transitory computer-readable storage medium of claim 10, wherein the stamp is configured to be selectable by a user to view content associated with the stamp, and wherein the stamp comprises an image or video frame of content represented by the stamp.

14. The non-transitory computer-readable storage medium of claim 10, having further processor-executable instructions stored thereon that cause the processor to present a plurality of stamps concurrently on the display with content transmitted to a user system from a content system;

remove the plurality of stamps after a predetermined number of stamps are presented on the display; and present a selectable stamp indicator on the display, the selectable stamp indicator representing the predetermined number of stamps.

15. A computer-implemented method comprising:

displaying content on a display of a user system;

receiving, by the user system, a stamp from at least one of an engagement system and a content system, wherein the stamp comprises an image or video frame of content represented by the stamp; and presenting the stamp and a stamp indicator representing a predefined number of stamps on the display.

16. The computer-implemented method of claim 15, wherein the stamp is one of a plurality of stamps, the user system is configured to present the plurality of stamp and the stamp indicator in a display strip on the display, and the display strip includes only a sequence of the plurality of stamps.

17. The computer-implemented method of claim 15, wherein an engagement system is configured to transmit the stamp to a user system, the user system causes the stamp to be displayed on the display concurrent with content transmitted to the user system from the content system.

18. The computer-implemented method of claim 15, wherein the method further includes:

providing a user with a user profile;

transmitting, by the engagement system, an engagement icon to the user system;

presenting the user with a selectable storefront that corresponds with the stamp and the engagement icon; and presenting an engagement icon interface on the display to the user upon selection of the storefront that corresponds with at least one of the stamp and the engagement icon.

19. The computer-implemented method of claim 15, wherein the method further includes:

storing information related to activities of a user with at least one of a storefront, stamp, a content icon, and an engagement icon on any memory associated with at least one of the engagement system, the user system, and the content system; and determining at least one of the activities to provide the user at a later time based on the stored information.

* * * * *